(12) United States Patent
Teruyama et al.

(10) Patent No.: US 8,213,860 B2
(45) Date of Patent: Jul. 3, 2012

(54) INFORMATION PROCESSING APPARATUS, METHOD, AND PROGRAM FOR PERFORMING NEAR FIELD COMMUNICATION WITH AN EXTERNAL DEVICE

(75) Inventors: Katsuyuki Teruyama, Tokyo (JP); Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/279,825

(22) Filed: Oct. 24, 2011

(65) Prior Publication Data

US 2012/0040614 A1 Feb. 16, 2012

Related U.S. Application Data

(63) Continuation of application No. 12/329,796, filed on Dec. 8, 2008, now Pat. No. 8,086,176.

(30) Foreign Application Priority Data

Dec. 18, 2007 (JP) .................. 2007-325543

(51) Int. Cl.
*H04B 5/00* (2006.01)

(52) U.S. Cl. ...................................... 455/41.1

(58) Field of Classification Search .......... 455/41.1, 455/41.2, 507, 509, 512, 513
See application file for complete search history.

(56) References Cited

U.S. PATENT DOCUMENTS

| 7,627,288 | B2 | 12/2009 | Iida |
| 7,720,438 | B2 | 5/2010 | Rowse |
| 7,734,252 | B2 | 6/2010 | Mechaley, Jr. |
| 7,953,368 | B2 | 5/2011 | Miwa et al. |
| 2002/0015393 | A1 | 2/2002 | Pan et al. |
| 2005/0282588 | A1 | 12/2005 | Linjama et al. |
| 2006/0268931 | A1 | 11/2006 | Sella |
| 2007/0235539 | A1 | 10/2007 | Sevanto et al. |

FOREIGN PATENT DOCUMENTS

| EP | 1 533 914 A2 | 5/2005 |
| EP | 1 806 869 A1 | 7/2007 |
| JP | 10-290411 | 10/1998 |
| JP | 2003-30596 | 1/2003 |
| JP | 2004-54394 | 2/2004 |
| JP | 2004-185601 | 7/2004 |
| JP | 2005-122228 | 5/2005 |
| JP | 3695464 | 7/2005 |

OTHER PUBLICATIONS

European Search Report dated Jun. 19, 2009 in EP 08 25 3983.
European Search Report dated Dec. 9, 2011 in EP 11 18 2606.1, 8 pages.

*Primary Examiner* — Jeffrey Zweizig
(74) *Attorney, Agent, or Firm* — Finnegan, Henderson, Farabow, Garrett & Dunner, L.L.P.

(57) ABSTRACT

An information processing apparatus including a plurality of elements each configured to perform an independent process, a controller configured to control the plurality of elements, and a front end shared by the plurality of elements and configured to perform near field communication with an external device. At a time of activation, the controller allocates, to the plurality of elements, different time slots for communication.

20 Claims, 16 Drawing Sheets

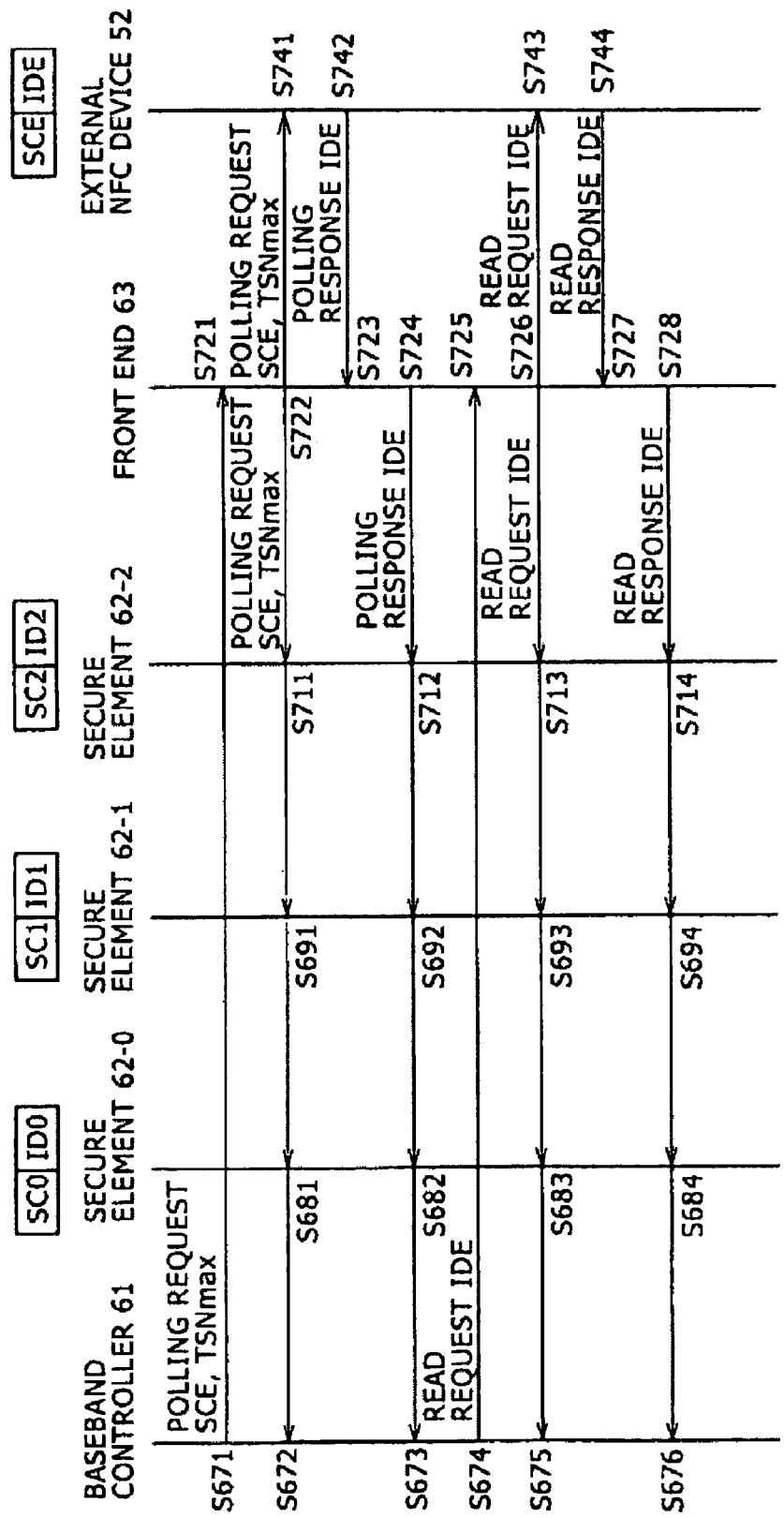

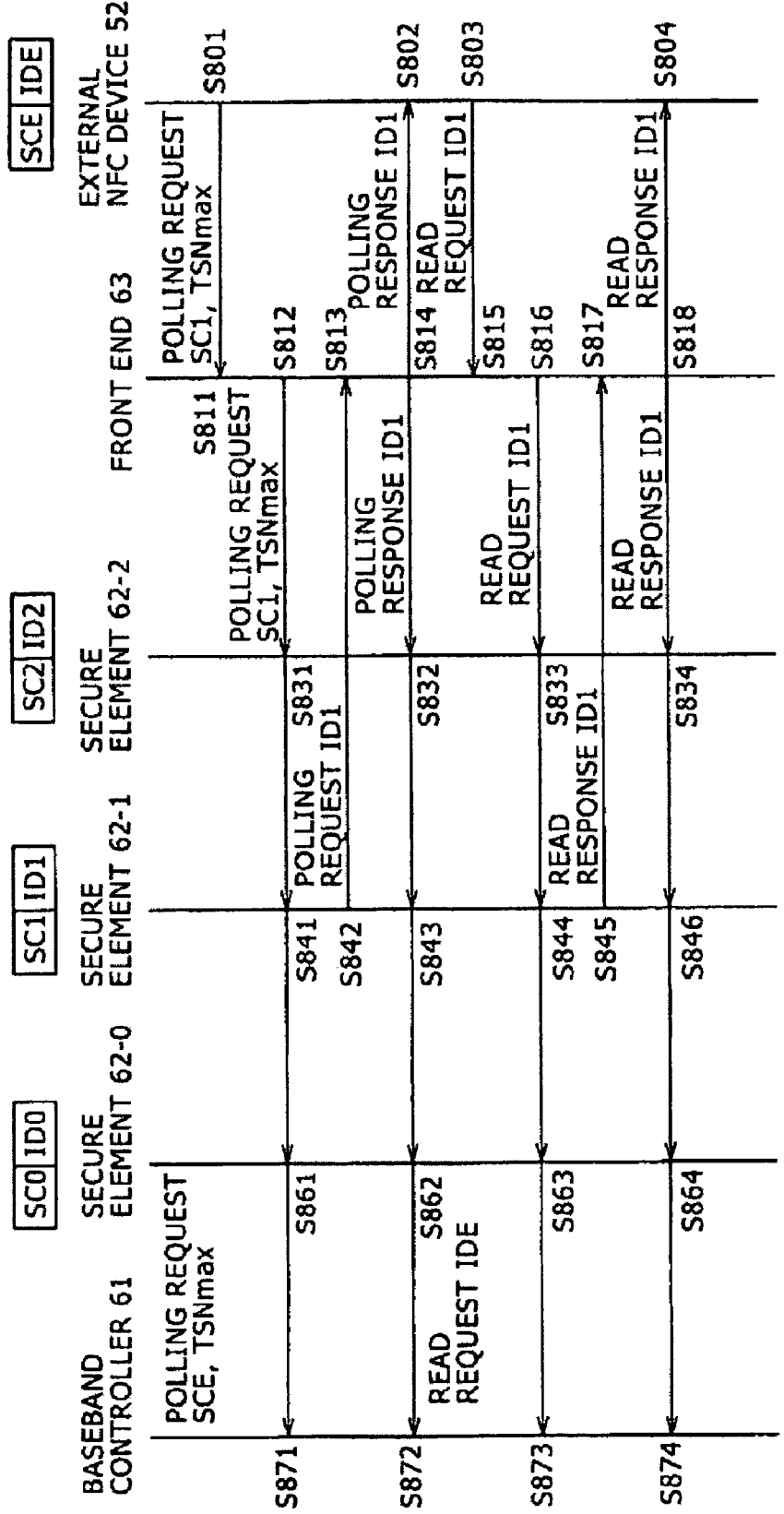

INFORMATION PROCESSING APPARATUS, METHOD, AND PROGRAM FOR PERFORMING NEAR FIELD COMMUNICATION WITH AN EXTERNAL DEVICE

CROSS REFERENCE TO RELATED APPLICATIONS

This is a continuation of application Ser. No. 12/329,796, filed Dec. 8, 2008, now U.S. Pat. No. 8,086,176 which claims the benefit of priority to Japanese Patent Application No. JP 2007-325543, filed on Dec. 18, 2008 in the Japan Patent Office, the entire contents of which are incorporated by reference herein.

BACKGROUND OF THE INVENTION

1. Field of the Invention

The present invention relates to an information processing apparatus, method, and program. In particular, the present invention relates to an information processing apparatus, method, and a program which enable establishment of communication in a short amount of time.

2. Discussion of the Background

The present applicant has previously made a proposition concerning near field communication (NFC) via electromagnetic induction, using a single-frequency carrier (see, for example, Japanese Patent Laid-Open No. 3695464). In the case where the single-frequency carrier is used, if a plurality of devices communicate with another single device at the same time, a collision occurs and as a result the single device cannot receive signals from the other plurality of devices effectively. As such, in the aforementioned proposition, each device generates a radio frequency (RF) field by itself after confirming that RF fields from other devices do not exist.

In some cases where a device (for example, device A) performs near field communication with another single device (for example, device B), device A contains a plurality of independent devices (for example, device a, device b, and device c), and device a, device b, and device c are connected with one another in a wired manner. In such cases, device A is capable of generating only one RF field. That is, each of device a, device b, and device c shares a communication section that uses the RF field with the other devices, and only one of device a, device b, and device c is capable of performing the near field communication with the other device B on behalf of device A.

If each of device a, device b, and device c in device A attempts to communicate with device B at the same time, a collision occurs. Because each of device a, device b, and device c does not generate an independent RF field, however, one of device a, device b, and device c is, unlike in the aforementioned proposition, are incapable of detecting in advance whether the other devices are generating the RF field.

SUMMARY OF THE INVENTION

The present invention has been devised in view of the above situation, and makes it possible to ensure avoidance of a collision even in the situation where a device is incapable of detecting in advance whether another device is generating the RF field.

One aspect of the present invention is an information processing apparatus including: a plurality of elements each configured to perform an independent process; a controller configured to control the plurality of elements; and a front end shared by the plurality of elements and configured to perform near field communication with an external device, wherein at a time of activation, the controller allocates, to the plurality of elements, different time slots for communication.

The elements may be contained in a single housing and connected to one another in a wired manner, and the time of the activation may be when power has been supplied or when any of the elements has been removed or added.

The plurality of elements may be composed of removable and fixed elements, and it may be so arranged that the fixed element stores the allocated time slot in a nonvolatile manner, whereas the removable element stores the time slot in a volatile manner.

The controller may allocate, to the fixed element, a time slot of the earliest timing, and allocate, to the removable element, a time slot of a later timing than that of the fixed element.

The time slot of the fixed element may be allocated thereto beforehand at a time of manufacture.

Each of the elements may be an element that securely performs a process based on a corresponding application, have application-based identification information and element-based identification information, and have a function of performing communication in a time slot of a random timing before the time slot is allocated thereto, and the controller may perform the allocation of the time slot employing the function of performing the communication in the time slot of the random timing.

Each of the elements may have a normal mode in which the element responds to a polling request and a request for setting the time slot, and a sleep mode in which the element responds to a reset request, and shift to the normal mode when the reset request has been received while in the sleep mode, and shift to the sleep mode when the time slot is set while in the normal mode.

One aspect of the present invention is an information processing method employed by an information processing apparatus including a plurality of elements each configured to perform an independent process, a controller configured to control the plurality of elements, and a front end shared by the plurality of elements and configured to perform near field communication with an external device, wherein at a time of activation, the controller allocates, to the plurality of elements, different time slots for communication.

One aspect of the present invention is a program for an information processing apparatus including a plurality of elements each configured to perform an independent process, a controller configured to control the plurality of elements, and a front end shared by the plurality of elements and configured to perform near field communication with an external device, the program causing a computer to perform a process of allowing the controller to allocate, to the plurality of elements, different time slots for communication, at a time of activation.

According to one aspect of the present invention, a controller allocates different time slots for communication to a plurality of elements at the time of activation.

As described above, according to one aspect of the present invention, it is possible to ensure avoidance of a collision.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 16 is a diagram illustrating a procedure in the case where data is read from the external NFC device according to an embodiment of the present invention; and FIG. 17 is a diagram illustrating a procedure in the case where data is read from an NFC device according to an embodiment of the present invention.

DETAILED DESCRIPTION OF THE PREFERRED EMBODIMENTS

Figure 1:
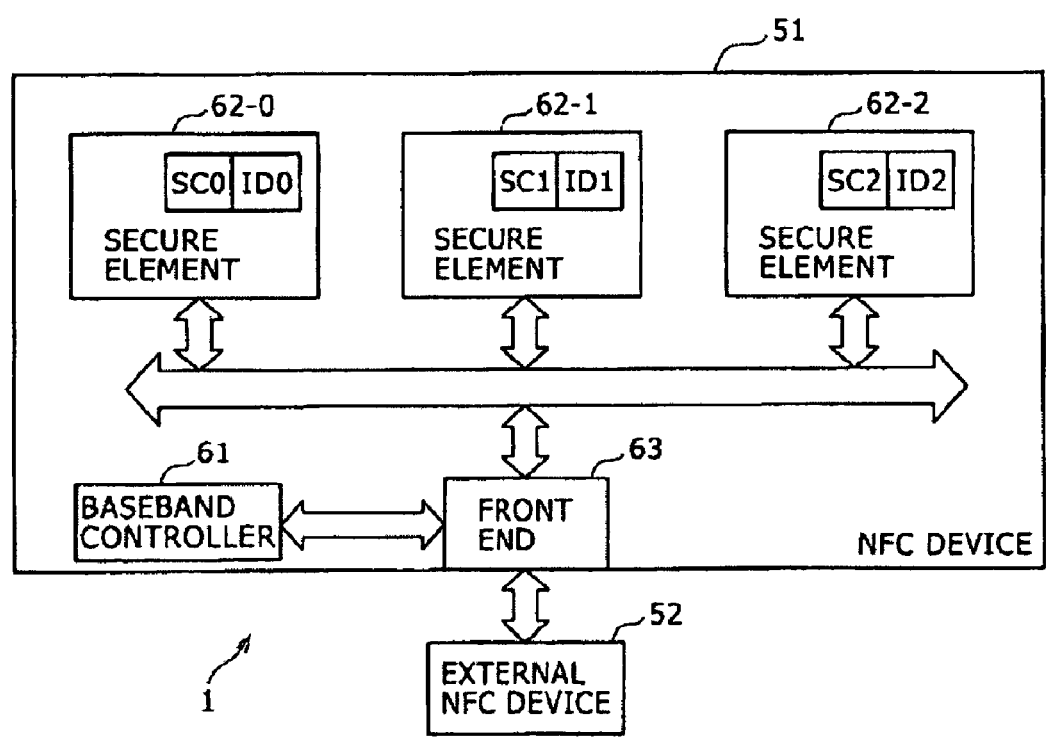
FIG. 1 is a block diagram illustrating the structure of an NFC communication system according to an embodiment of the present invention.

Referring now to the drawings, wherein like reference numerals designate identical or corresponding parts throughout the several views.

FIG. 1 shows the structure of an NFC communication system 1 according to one embodiment of the present invention. In this embodiment, the NFC communication system 1 is composed of an NFC device 51 and an external NFC device 52.

The NFC device 51 is commonly formed by a portable device, such as an IC (Integrated Circuit) card, a cellular phone, a PDA (Personal Digital Assistant), a wrist watch, a pen, or a personal computer, for example, whereas the external NFC device 52 is formed by a reader/writer, for example. It will be understood, however, that the above are simply examples. The external NFC device 52 and the NFC device 51 perform near field communication with each other within a distance of tens of centimeters (including the case where they are in contact with each other), using a carrier of 13.56 MHz in the ISM (Industrial, Scientific and Medical) band, for example.

Figure 2:
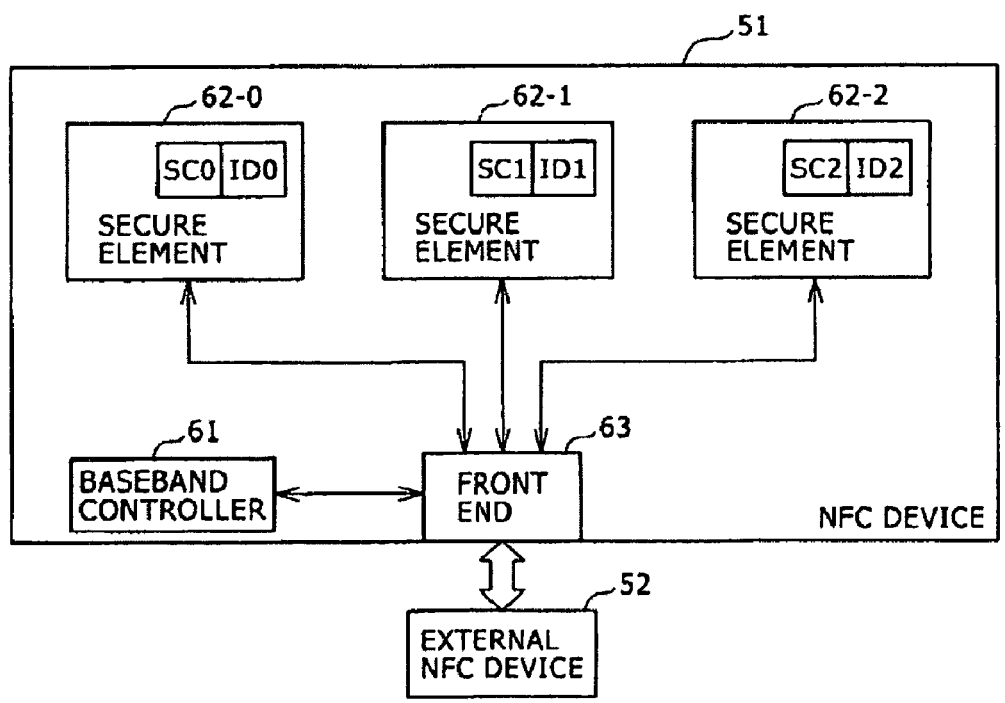
FIG. 2 is a block diagram illustrating the structure of an NFC communication system according to an embodiment of the present invention.

A housing of the NFC device 51 contains a baseband controller 61, secure elements 62-0, 62-1, and 62-2, and a front end 63. The secure element 62-0 is incorporated and fixed therein at the time of manufacture of the NFC device 51. Meanwhile, the secure elements 62-1 and 62-2 can be removed and installed, as necessary, by an administrator (i.e., an entity that provides the NEC device 51 to a user) of the NFC device 51. As shown in FIG. 1 and FIG. 2, the baseband controller 61 and the front end 63, and the secure elements 62-0, 62-1, and 62-2 and the front end 63, are connected to one another via a wire such as a bus or a cord.

The baseband controller 61 controls an operation of each of the secure elements 62-0, 62-1, and 62-2 (hereinafter, they will be referred to simply as "secure element(s) 62" unless they need to be distinguished individually). In particular, the baseband controller 61 performs, at the time of the manufacture, a process of allocating a time slot for communication to the secure element 62-0, and at the time of activation, performs a process of allocating different time slots for communication to the plurality of secure elements 62-0, 62-1, and 62-2. Examples of the time of the activation include a time when power has been supplied and a time when any of the secure elements 62 has been removed or added.

Each of the secure elements 62-0, 62-1, and 62-2 operates in accordance with a separate application, and performs an independent process securely. A system code, as identification information for identifying an application, is assigned to each application. For example, the secure element 62-0 functions as a rail pass to which system code SC0 is assigned, the secure element 62-1 has system code SC1 assigned thereto and functions as a prepaid card to be used for payment at a given affiliated store, and the secure element 62-2 functions as an ID (Identification) card for the user's place of employment to which system code SC2 is assigned. When the NFC device 51 is placed close to the external NFC device 52 that operates in accordance with an application of a given system code, for example, one of the secure elements 62 that corresponds to the application of that system code communicates with the external NFC device 52.

In addition, the secure elements 62-0, 62-1, and 62-2 are assigned with identification numbers ID0, ID1, and ID2, respectively, which are identification information for identifying the respective secure elements.

An administrator of each application knows a system code of the application that he or she administers but does not know system codes of applications that are administered by other administrators. Each secure element 62 specifies the system code to recognize presence of another secure element 62 of the corresponding application, acquires an ID of the recognized secure element 62 individually, and communicates with the individual secure element 62 based on the ID.

The front end 63 performs the near field communication with the external NFC device 52 on behalf of the NFC device 51. That is, the front end 63 is shared by the baseband controller 61 and the secure elements 62-0, 62-1, and 62-2, and has a function of performing the near field communication with the external NFC device 52. Therefore, the front end 63 supplies a signal from the baseband controller 61 to the secure elements 62-0, 62-1, and 62-2 and the external NFC device 52, and supplies a signal from the external NFC device 52 to the baseband controller 61 and the secure elements 62-0, 62-1, and 62-2. The signal supplied from the front end may include system code as identification information for identifying one secure element from among several secure elements. A signal from any of the secure elements 62-0, 62-1, and 62-2 is supplied to the other two, the baseband controller 61, and the external NFC device 52. Note that the signals are exchanged on a packet basis.

Figure 3:
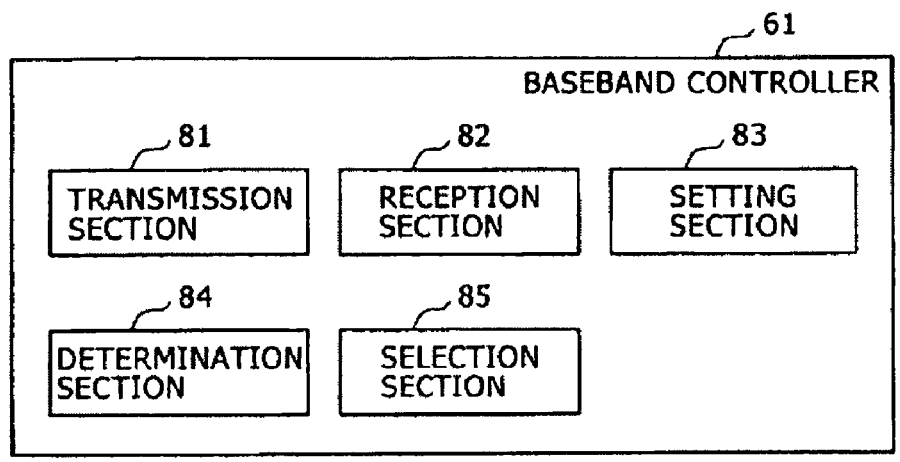
FIG. 3 is a block diagram illustrating a functional structure of a baseband controller according to an embodiment of the present invention.

FIG. 3 shows a functional structure of the baseband controller 61 according to one embodiment. The baseband controller 61 includes a transmission section 81, a reception section 82, a setting section 83, a determination section 84, and a selection section 85.

The transmission section 81 transmits a signal to the front end 63. The reception section 82 receives a signal from the front end 63. The setting section 83 sets a value in a variable. The determination section 84 makes various determinations. The selection section 85 makes various selections.

Figure 4:
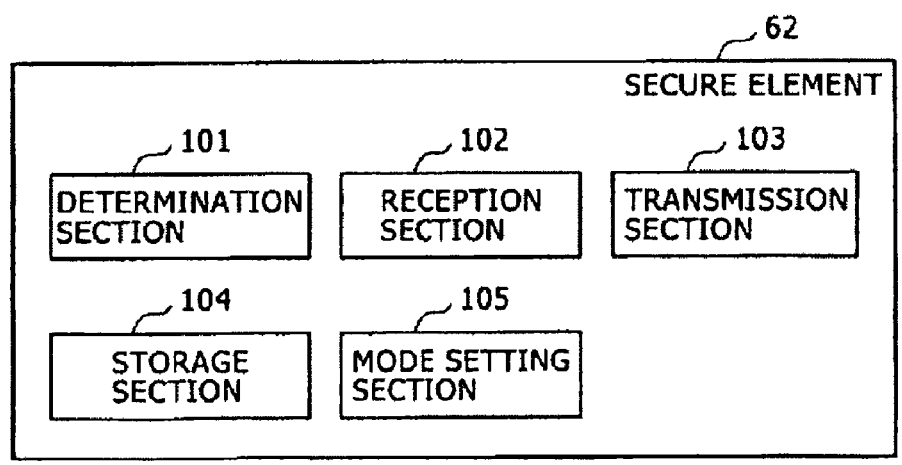
FIG. 4 is a block diagram illustrating a functional structure of a secure element according to an embodiment of the present invention.

FIG. 4 shows a functional structure of the secure element 62 according to one embodiment. The secure element 62 includes a determination section 101, a reception section 102, a transmission section 103, a storage section 104, and a mode setting section 105.

The determination section 101 makes various determinations. The reception section 102 receives a signal from the front end 63. The transmission section 103 transmits a signal to the front end 63. The transmission section 103 has a function of performing communication in a time slot of a random timing before the allocation of the time slot.

The storage section 104 stores the system code of each of the applications and the identification number as the identification information for identifying each of the secure elements 62 in a nonvolatile manner. Among the secure elements 62, the secure element 62-0, which is incorporated and fixed in the NFC device 51 at the time of the manufacture thereof, stores a set time slot number in a nonvolatile manner. The secure elements 62-1 and 62-2, which are installed therein after the manufacture thereof, store set time slot numbers in a volatile manner.

The mode setting section 105 sets a mode of the secure element 62 to a normal mode or a sleep mode.

Figure 5:
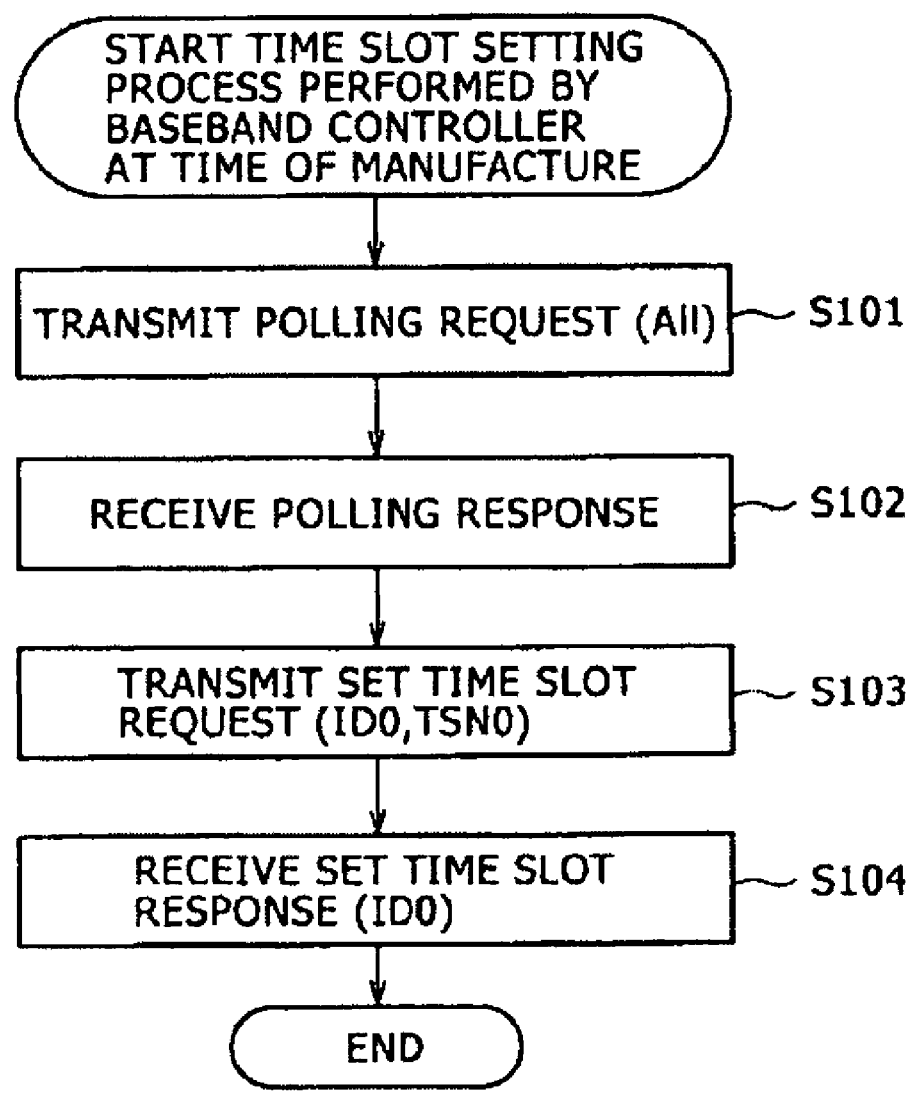
FIG. 5 is a flowchart illustrating a time slot setting process performed by the baseband controller at the time of manufacture according to an embodiment of the present invention.
Figure 6:
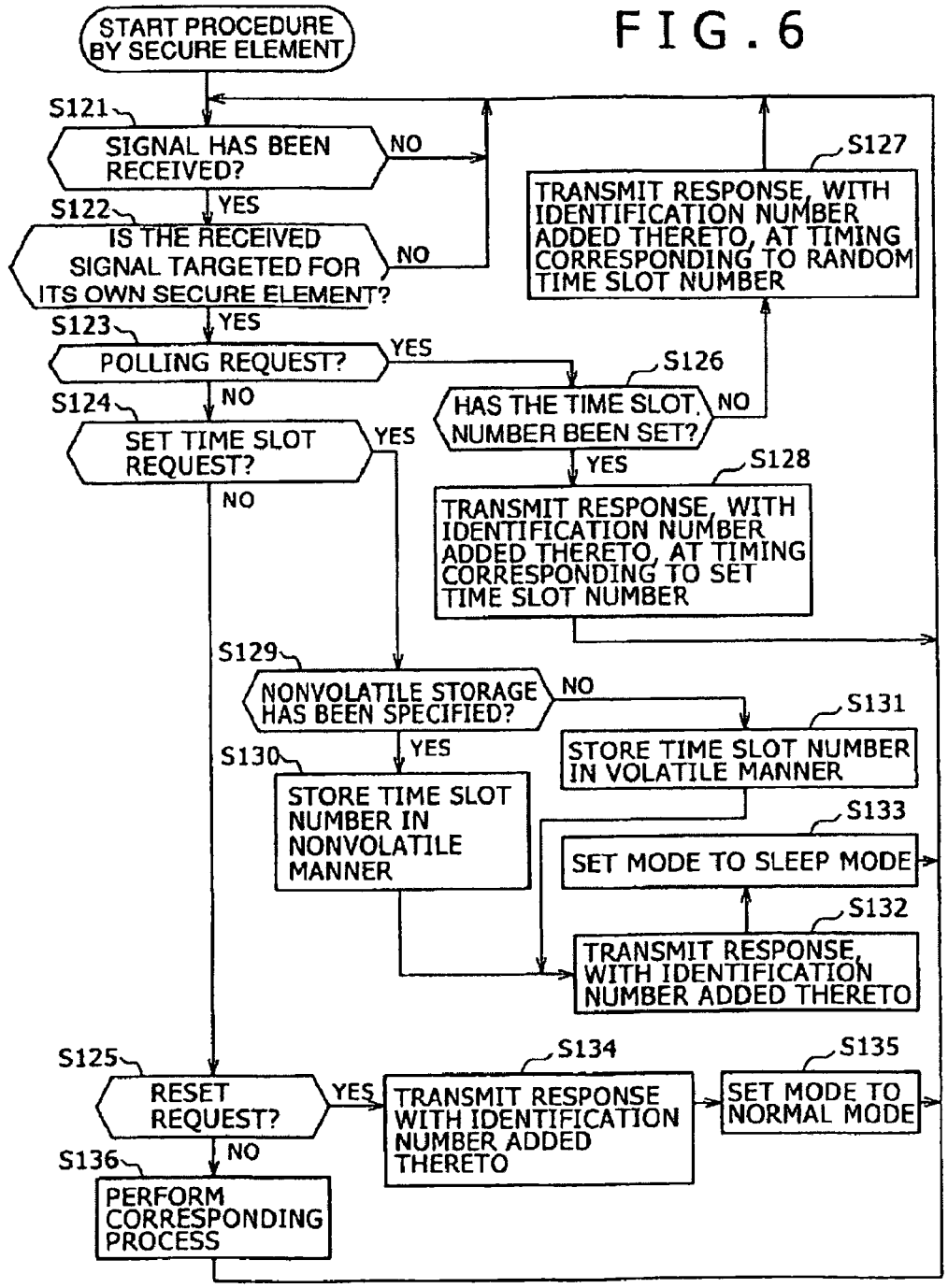
FIG. 6 is a flowchart illustrating a procedure performed by the secure element according to an embodiment of the present invention.

Next, referring to flowcharts of FIG. 5 and FIG. 6, a time slot setting process performed at the time of the manufacture of the NFC device 51 will now be described below. FIG. 5 shows a procedure performed by the baseband controller 61 at the time of the manufacture of the NFC device 51. FIG. 6 shows a procedure performed by the secure element 62 when a power of the NFC device 51 has been turned on.

At the time of the manufacture of the NFC device 51, a manufacturer turns on the power of the NFC device 51, and operates the external NFC device 52 in a factory to issue an instruction for writing of a time slot number. At step S101 in FIG. 5, based on this instruction, the transmission section 81 of the baseband controller 61 in the NFC device 51 transmits a polling request. A system code of this polling request is set to "All," and this command requires all of the secure elements 62 to return a response. In the current case, however, only the secure element 62-0 is installed in the NFC device 51.

The reception section 102 of the secure element 62 receives the signal from the baseband controller 61. At step S121 in FIG. 6, the determination section 101 determines whether any signal has been received, and if no signal has been received, control waits until any signal is received. If any signal is received, the determination section 101 determines at step S122 whether the received signal is targeted for its own secure element 62. In the current case, it is determined whether the system code of its own secure element 62 corresponds with the system code specified in the polling request. If the received signal is not targeted for its own secure element 62, that signal is ignored, and control returns to step S121.

If the received signal is targeted for its own secure element 62 (in the current case, all system codes have been specified, and therefore the system code of its own secure element 62 corresponds therewith), the determination section 101 determines at step S123 whether the received signal is the polling request. If the received signal is the polling request, i.e., if the system code of its own secure element 62 has been specified and the polling request has been received, the determination section 101 determines at step S126 whether the time slot number has been set in its own secure element 62. If the time slot number has been set therein, the transmission section 103 transmits a response at step S128, with the identification number of its own secure element 62 added thereto, at a timing corresponding to the set time slot number. Because the time slot number has not been set yet in the foregoing processes, the transmission section 103, at step S127, transmits a response, with the identification number added thereto, at a timing corresponding to a random time slot number.

At step S102 in FIG. 5, the reception section 82 of the baseband controller 61 receives the polling response transmitted from the secure element 62. In the current case, only the secure element 62-0 is installed in the NFC device 51, and therefore, the response is transmitted only from the secure element 62-0, whose identification number is ID0.

At step S103, the transmission section 81 transmits a set time slot request (ID0, TSN0). That is, the secure element 62-0, whose identification number is ID0, is requested to set time slot number TSN0 therein. In addition, at this time, nonvolatile storage is specified, as a storage method, with a parameter.

Because the identification number ID0 is specified in the set time slot request, it is acquired only by the secure element 62-0, and would be ignored by the secure elements 62-1 and 62-2 even if they were present. That is, the determination section 101 of the secure element 62-0 determines at step S121 if any signal has been received, and determines at step S122 whether the received signal is targeted for its own secure element 62. In the current case, because the identification number ID0 has been specified therein, it is determined that the received signal is targeted at the secure element 62-0. Further, the determination section 101 determines at step S123 that the signal is not the polling request, and thereafter at step S124, determines whether the received signal is the set time slot request.

If it is determined that the received signal is the set time slot request, the determination section 101 determines at step S129 whether the nonvolatile storage has been specified as the storage method, based on the parameter for the storage method in the set time slot. If the nonvolatile storage has not been specified (i.e., if volatile storage has been specified), the storage section 104, at step S131, stores the received time slot number in the volatile manner, as the time slot number of its own secure element 62. Because of the volatile manner, the time slot number as stored therein will be erased when power is no longer supplied.

On the other hand, in the case where the nonvolatile storage has been specified with the parameter as the method for storing the set time slot, the storage section 104 stores the received time slot number in a nonvolatile manner at step S130. Because this time slot number is stored in the nonvolatile manner, it will be retained even after supply of the power to the NFC device 51 is stopped. Even in the case where any time slot number has been stored therein previously, the process of step S130 is performed nevertheless, and the existing time slot number is overwritten with the new time slot number.

After the storage process of step S130 or S131, the transmission section 103 transmits a response at step S132, with the identification number of its own secure element 62 added thereto. In the current case, the secure element 62-0 transmits a response, with the identification number ID0 added thereto.

Figure 7:
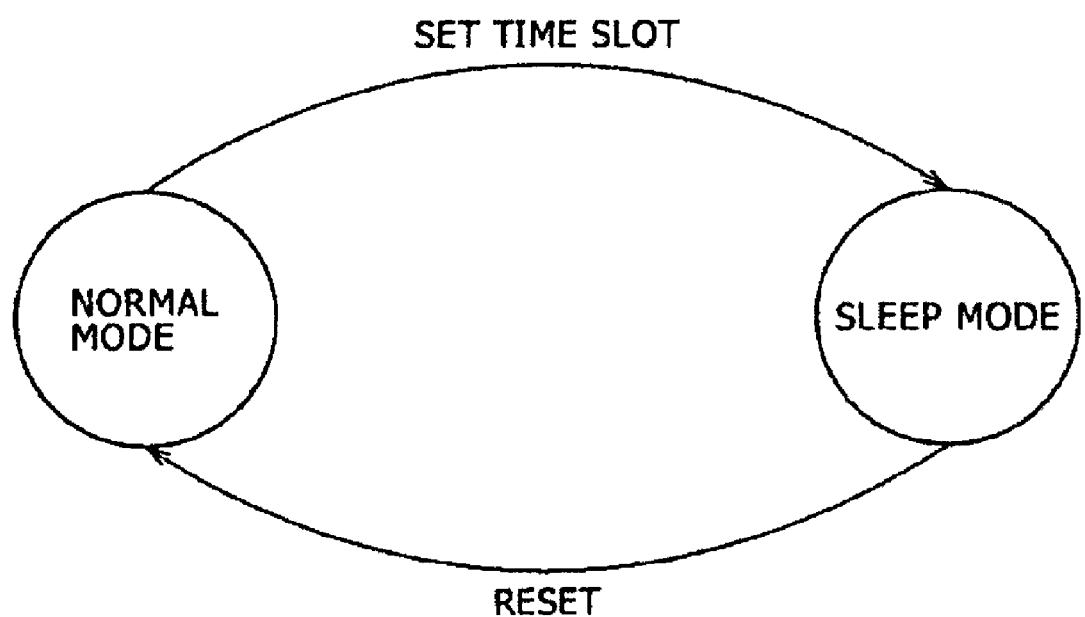
FIG. 7 is a diagram illustrating modes according to an embodiment of the present invention.

As shown in FIG. 7, the secure element 62 has two modes: a normal mode and a sleep mode. When in an initial state, the secure element 62 is set to the normal mode. While in the normal mode, the secure element 62 is capable of responding to the polling request, the set time slot request, and other commands. While in the sleep mode, the secure element 62 is capable of responding only to a reset request. When setting the time slot in the normal mode, the mode setting section 105 shifts the mode to the sleep mode. If the reset request has been received in the sleep mode, the mode setting section 105 shifts the mode to the normal mode. In the current case, because the set time slot request has been received in the normal mode, the mode setting section 105 sets the mode to the sleep mode at step S133.

If the set time slot response is transmitted at step S132, the reception section 82 of the baseband controller 61 receives the set time slot response (ID0) at step S104. That is, the baseband controller 61 receives the response from the secure element 62-0 with the identification number ID0 added thereto, thereby recognizing that the time slot number TSN0 has been stored in the secure element 62-0. Note that the processes of step S132 and step S133 may be performed in opposite order.

Figure 9:
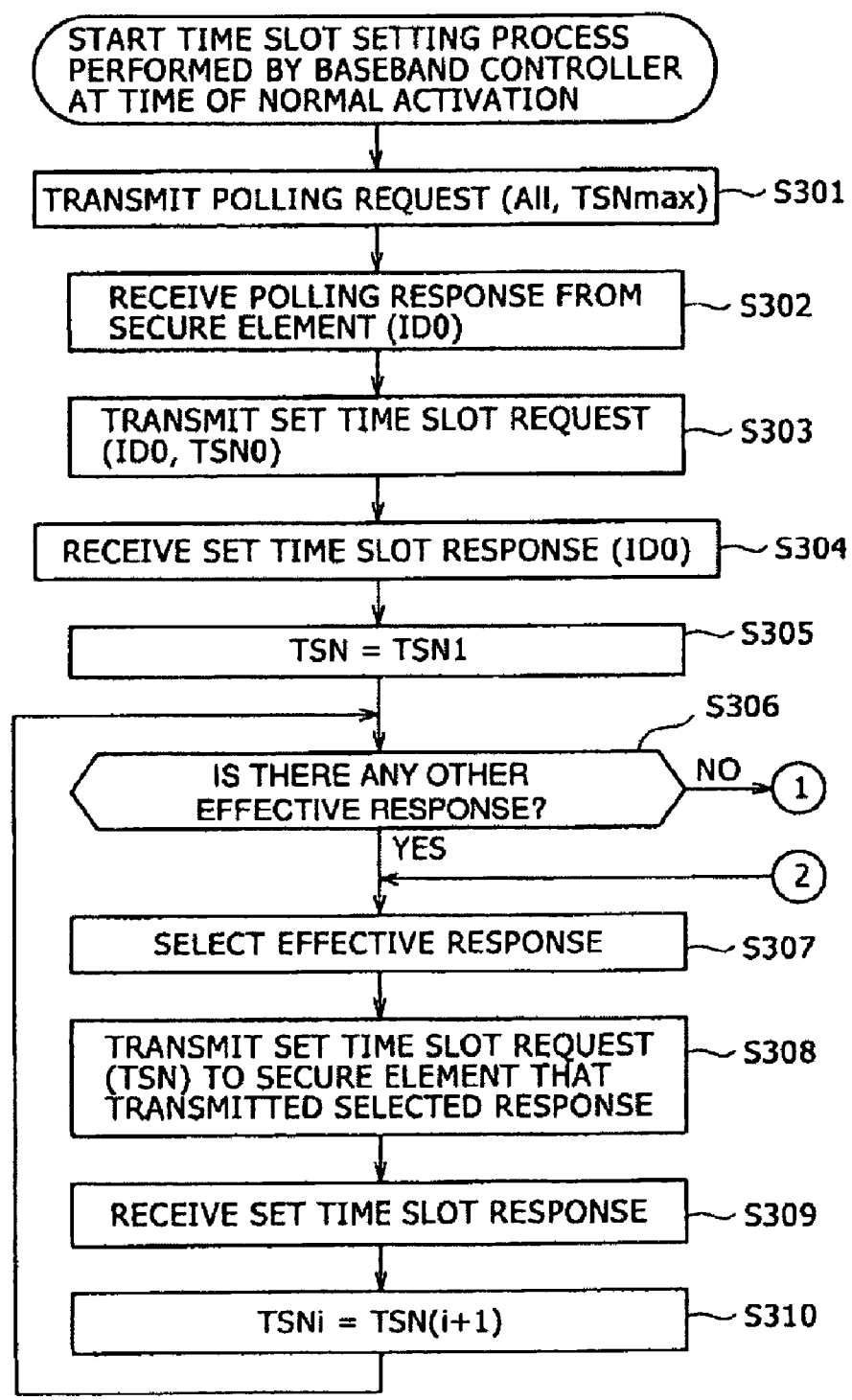
FIG. 9 is a flowchart illustrating a time slot setting process performed by the baseband controller at the time of normal activation according to an embodiment of the present invention.
Figure 10:
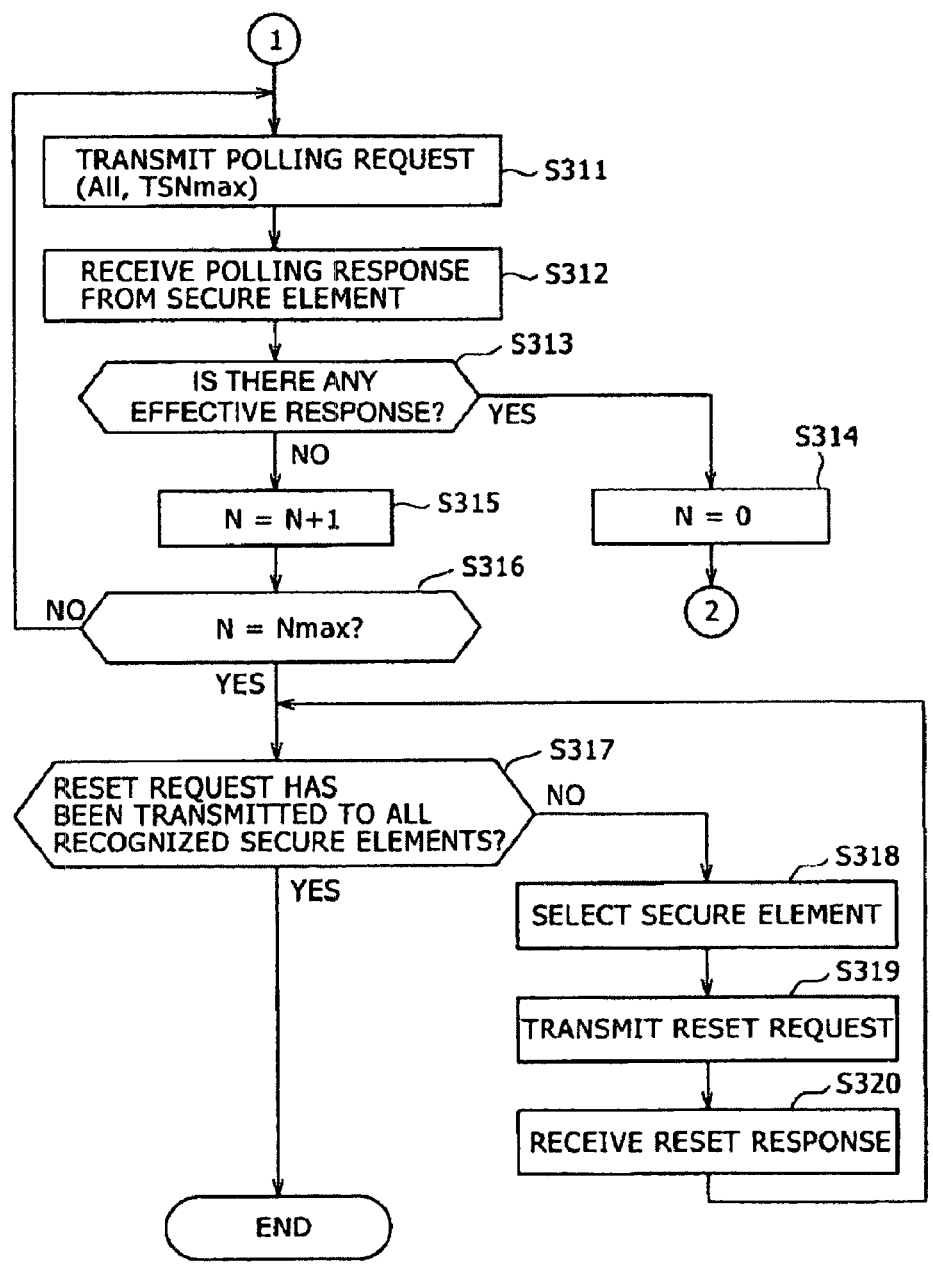
FIG. 10 is a flowchart illustrating the time slot setting process performed by the baseband controller at the time of the normal activation according to an embodiment of the present invention.
Figure 11:
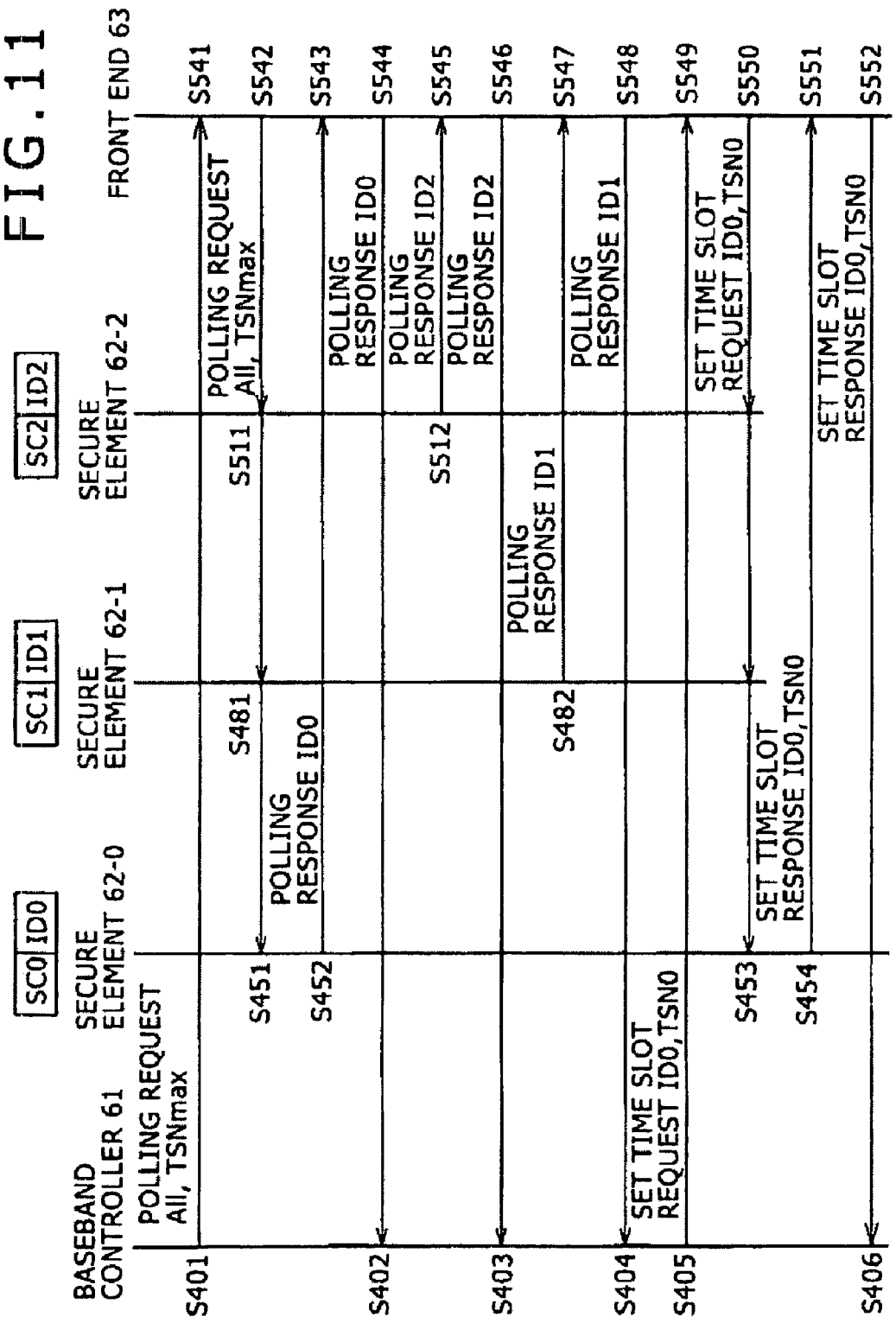
FIG. 11 is a diagram illustrating the time slot setting process at the time of the normal activation according to an embodiment of the present invention.
Figure 12:
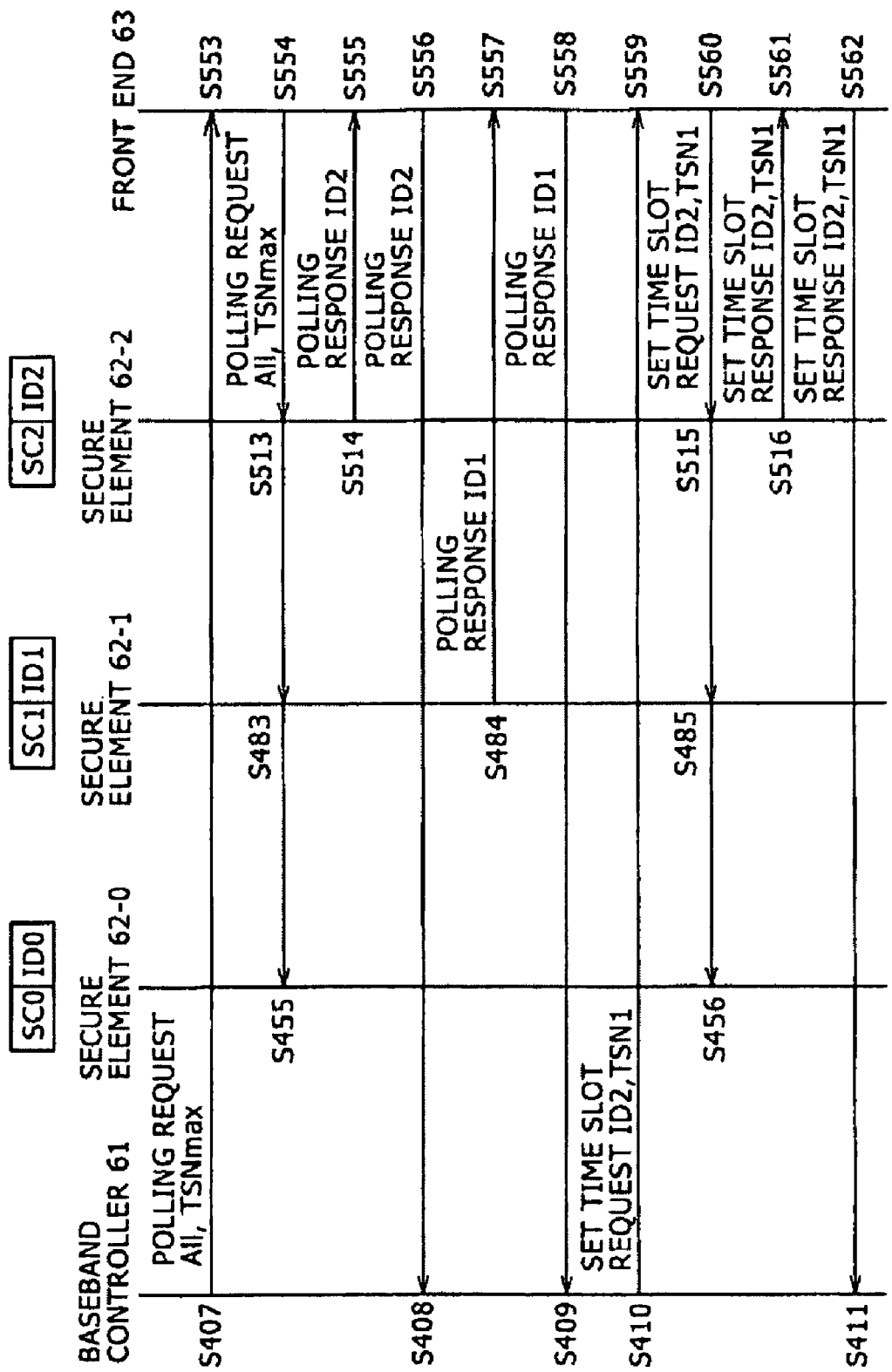
FIG. 12 is a diagram illustrating the time slot setting process at the time of the normal activation according to an embodiment of the present invention.
Figure 13:
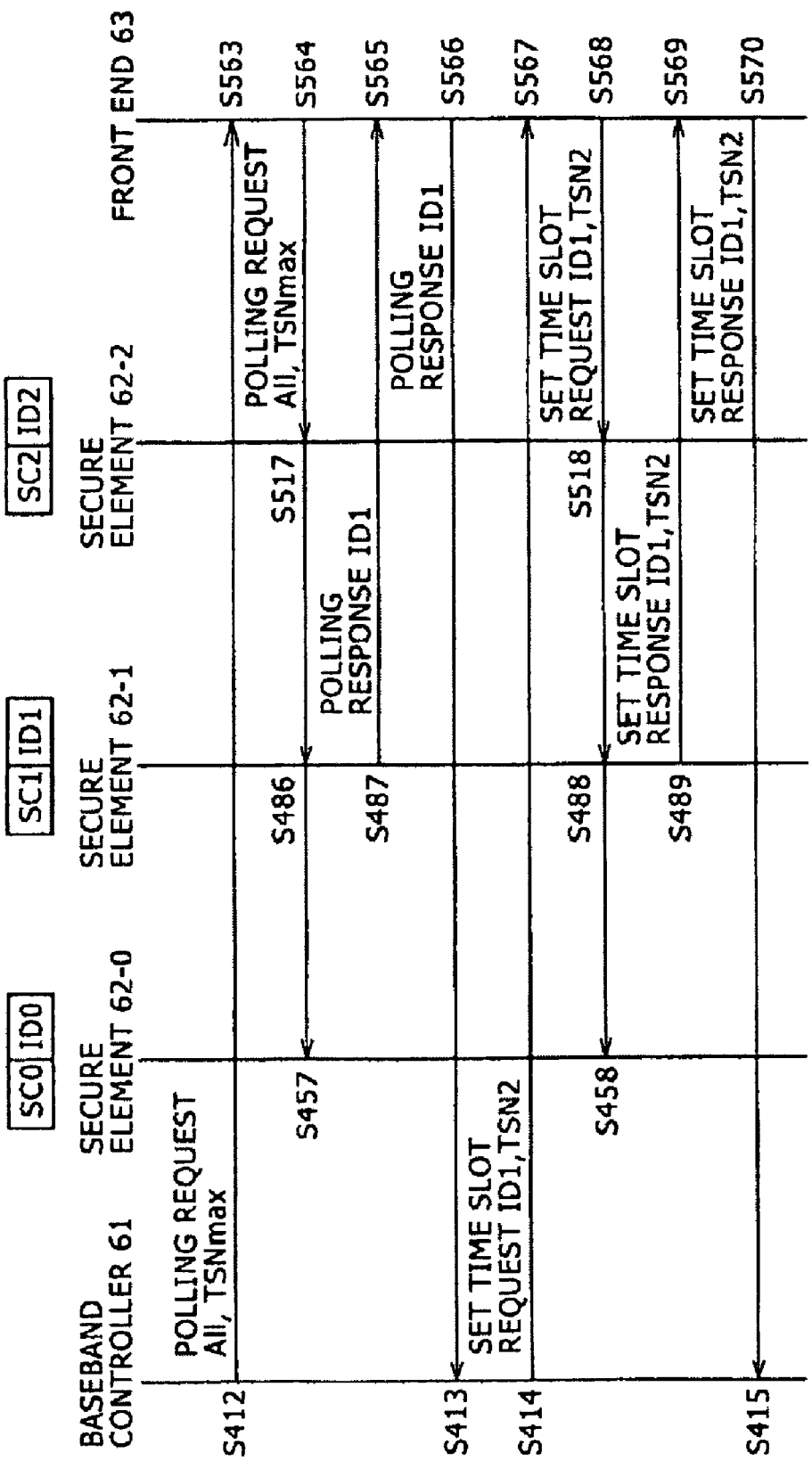
FIG. 13 is a diagram illustrating the time slot setting process at the time of the normal activation according to an embodiment of the present invention.
Figure 14:
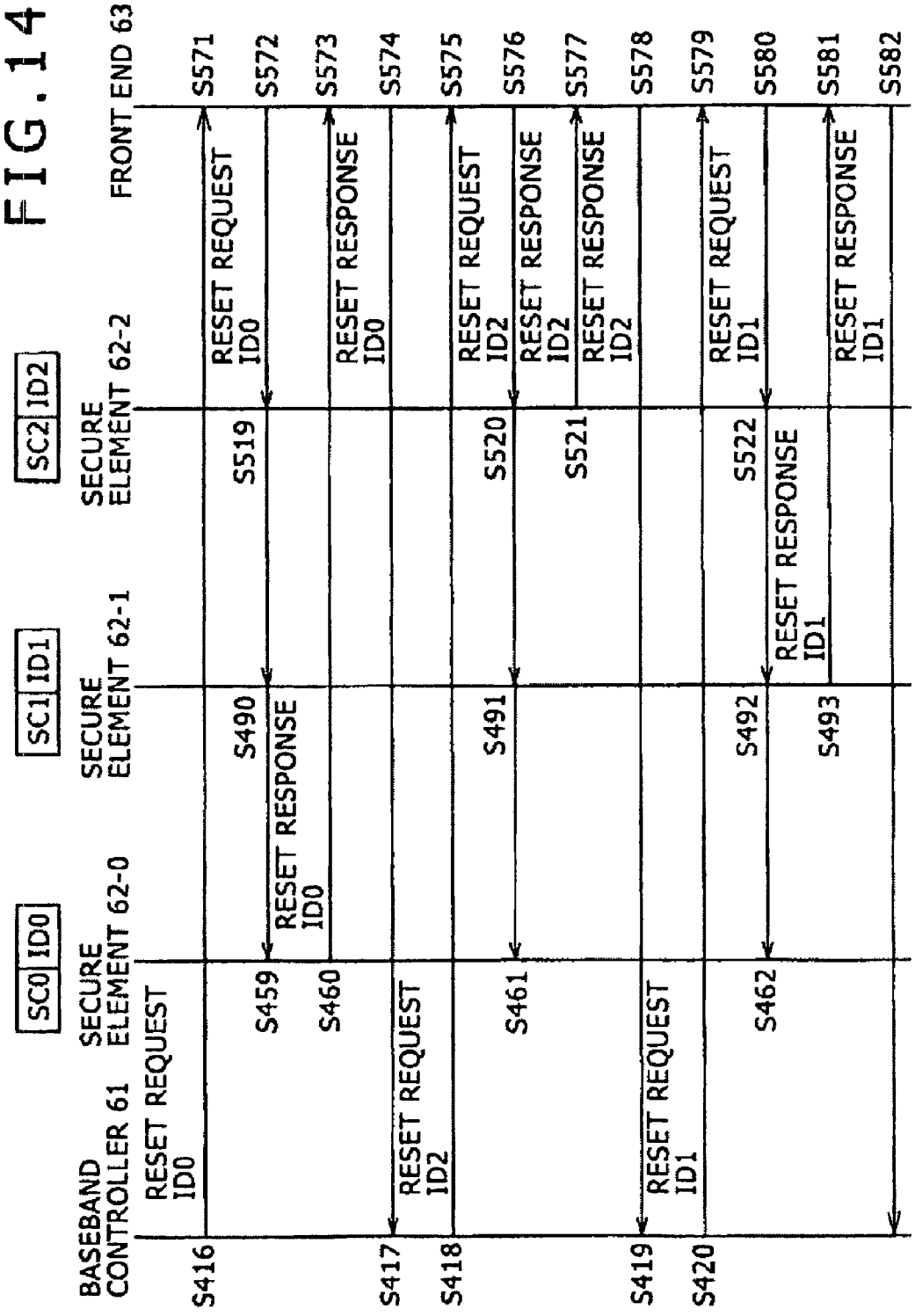
FIG. 14 is a diagram illustrating the time slot setting process at the time of the normal activation according to an embodiment of the present invention.

If it is determined at step S124 in FIG. 6 that the received signal is not the set time slot request, processes of steps S125 to S136 are performed. These processes will be described later in conjunction with a time slot setting process at the time of normal activation as shown in FIG. 9 and FIG. 10.

Figure 8:
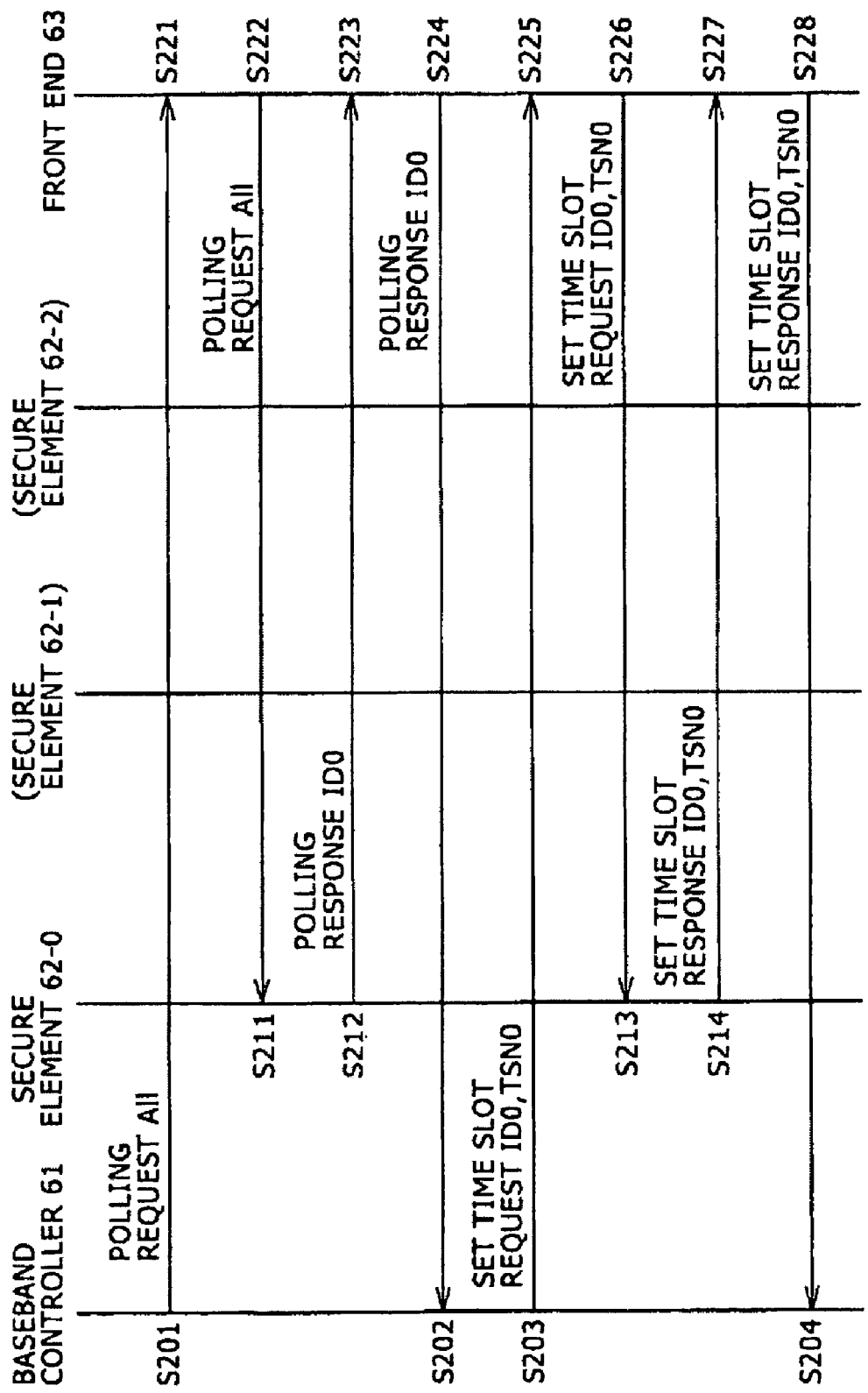
FIG. 8 is a diagram illustrating the time slot setting process at the time of the manufacture according to an embodiment of the present invention.

Mutual relationships between the baseband controller 61, the secure element 62-0, and the front end 63, concerning the process of setting the time slot at the time of the manufacture, will now be further described below with reference to FIG. 8.

At step S201, the transmission section 81 of the baseband controller 61 transmits the polling request to the secure elements 62 of all system codes. The front end 63 receives this request at step S221, and transmits this request to all the secure elements 62 at step S222, by broadcasting it or via path control. In the current case, however, only the secure element 62-0 is installed, and therefore, the reception section 102 of the secure element 62-0 receives it at step S211.

At step S212, in response to this request, the transmission section 103 of the secure element 62-0 returns the polling response, with the identification number of its own secure element 62, ID0, added thereto. This response is transmitted to the baseband controller 61, which is the source of the request, at a timing corresponding to a random time slot number. The front end 63 receives this response at step S223, and transmits this response to the baseband controller 61 at step S224.

At step S202, the baseband controller 61 receives this response via the reception section 102 thereof to recognize the identification number ID0 of the responding secure element 62-0. Accordingly, the baseband controller 61 is capable of directly communicating with the secure element 62-0 thereafter.

Thus, at step S203, the transmission section 81 of the baseband controller 61 transmits the set time slot request to the secure element 62-0, whose identification number is ID0. In this request, the time slot number TSN is set to a minimum value TSN0.

The front end 63 receives this request at step S225, and transmits this request to the secure element 62-0 at step S226. At step S213, the secure element 62-0, whose identification number is ID0, receives this request via the reception section 102 thereof, and the storage section 104 stores the time slot number TSN0 in a nonvolatile manner. As a result, the secure element 62-0 performs communication at a timing corresponding to the stored time slot number TSN0 thereafter. Because the time slot number TSN0 is a value corresponding to the earliest timing, the secure element 62-0 is able to perform communication earlier than any other secure element 62.

At step S214, the transmission section 103 of the secure element 62-0 transmits the set time slot response to the baseband controller 61, which is the source of the request. To this response, ID0 is added as the identification number of the transmitter, and also the set and stored time slot number TSN0, which has been set and stored, is added for confirmation.

The front end 63 receives this response at step S227, and transmits this response to the baseband controller 61 at step S228. The reception section 82 of the baseband controller 61 receives this response at step S204, thereby recognizing that the time slot number has been stored in the secure element 62-0.

In the above-described manner, the time slot number is stored in the nonvolatile manner beforehand in the secure element 62-0, which is installed in the NFC device 51 at the time of the manufacture thereof. Note that, in the case where a plurality of secure elements 62 are initially installed therein, the time slot number is stored in each of them in the nonvolatile manner.

When used, the NFC device 51, in which the secure element 62-0 is fixedly installed, is further provided with the removable secure elements 62-1 and 62-2, as shown in FIG. 1 and FIG. 2.

In the case where the NFC device 51 containing the secure elements 62-0, 62-1, and 62-2 is used as described above, the time slot setting process at the time of the normal activation as shown in FIG. 9 and FIG. 10 is performed when the power has been supplied to the NFC device 51.

When the power of the NFC device 51 has been turned on, or in the case where a sufficient amount of time can be spent to read data from or write data to the NFC device 51, when the NFC device 51 is placed close to the external NFC device 52 and supplied with the power, the baseband controller 61 in the NFC device 51 performs, on its own initiative, the time slot setting process at the time of the normal activation as shown in FIG. 9 and FIG. 10. That is, while the time slot of the earliest timing has been allocated to the fixed secure element 62-0, time slots of later timings than that of the fixed secure element 62-0 are allocated to the removable secure elements 62-1 and 62-2 in the following manner.

At step S301, the transmission section 81 of the baseband controller 61 transmits a polling request (All, TSNmax). This request is targeted at the secure elements 62 of all (All) system codes. In addition, at this time, the time slot number TSN is set to a maximum value TSNmax (e.g., 15). That is, the secure elements 62 are allowed to return a response at a timing of any number up to the maximum number.

The reception section 102 of each secure element 62 receives this request, and determines whether the time slot number has been set therein (step S126 in FIG. 6). The time slot number has previously been set and stored in the secure element 62-0 in the nonvolatile manner by the above-described process at the time of the manufacture. Therefore, the transmission section 103 of the secure element 62-0 transmits the polling response to the baseband controller 61 at the timing corresponding to the time slot number TSN0 (step S128 in FIG. 6). On the other hand, the time slot number has not been set yet in the secure element 62-1 or 62-2, and therefore, they return responses at timings corresponding to random time slot numbers (step S132 in FIG. 6).

Because the time slot number set in the secure element 62-0 corresponds to the earliest timing, the reception section 82 of the baseband controller 61 receives, at step S302, the polling response from the secure element 62-0 with ID0, among the secure elements 62. At step S303, the transmission section 81 of the baseband controller 61 transmits the set time slot request. In this request, ID0 of the secure element 62-0 and TSN0 are set as the identification number of the destination and the time slot number, respectively.

The reception section 102 of the secure element 62-0 receives this request, and because the identification number of the secure element 62-0 is ID0 and the time slot number has already been stored therein, the transmission section 103 thereof returns a response (step S132 in FIG. 6), and the mode setting section 105 thereof sets the mode to the sleep mode (step S133 in FIG. 6). As a result, the secure element 62-0 will not respond to any other request than the reset request thereafter. This contributes to preventing responses by the other secure elements 62 from being obstructed.

At step S304, the reception section 82 of the baseband controller 61 receives this response from the secure element 62-0, whose identification number is ID0, and recognizes that the mode thereof has been shifted to the sleep mode.

At step S305, the setting section 83 of the baseband controller 61 sets the time slot number TSN to TSN1. That is, the number TSN1, which corresponds to the second earliest timing after that of the number ISM) allocated to the secure element 62-0, is set.

At step S306, the determination section 84 of the baseband controller 61 determines whether there is any other effective response. That is, the secure elements 62-1 and 62-2 return the response to the polling request at the timings corresponding to the random time slot numbers. Unless a conflict of time slot numbers occurs, the baseband controller 61 is able to receive these responses. It is possible to recognize an occurrence of the conflict by an error in an error check code added to a packet. No error being in the error check code means that no conflict has occurred.

If there is any other effective response, the selection section 85 selects one effective response at step S307. At step S308, the transmission section 81 transmits the set time slot request to the secure element 62 which transmitted the selected response. At this time, the time slot number TSN has the value TSN1 as set at step S305. In addition, because the secure element is removable, the storage method is set to the volatile storage. As such, this setting process is performed at the time of the activation, i.e., when the power has been supplied or when the secure element 62 has been removed or added.

The secure element 62 receives this request, and returns a response at a timing corresponding to a random time slot number (step S127 in FIG. 6). The reception section 82 of the baseband controller 61 receives this set time slot response at step S309. At step S310, the setting section 83 increments the time slot number TSN by one. In the current case, the time slot number TSN is set to TSN2.

Thereafter, control returns to step S306, and it is determined whether there is yet another effective response. If there is yet another effective response, that response is selected at step S307, and similar processes are performed.

If it is determined that there is no other effective response, the transmission section 81 of the baseband controller 61 transmits the polling request at step S311. At this time, all system codes are specified, and the time slot number is set to the maximum value TSNmax.

Each secure element 62 returns a response to this request (step S127 in FIG. 6). However, the secure element 62 in which the time slot has already been set does not return a response because the sleep mode is set therein (step S133 in FIG. 6). As a result, without being disturbed by a response from any secure element 62 in which the time slot number has already been set, the baseband controller 61 is able to receive a response only from the secure element 62 in which the time slot number has not been set yet. Thus, the process of setting the time slot number can be achieved quickly.

At step S312, the reception section 82 of the baseband controller 61 receives the polling response from the secure element 62. At step S313, the determination section 84 determines whether there is any effective response. If there is any effective response, the setting section 83, at step S314, sets variable N, which represents the number of times no response has been returned to the polling, to 0.

Thereafter, in steps S307 to S310 and step S306, processes are performed in which an effective response is selected, and the set time slot request is transmitted to the secure element 62 which transmitted that response so that the time slot is set therein.

If there is no effective response, the setting section 83 increments the variable N by one at step S315. At step S316, the determination section 84 determines whether the variable N has reached a previously-set maximum value Nmax. If the variable N has not reached the maximum value Nmax, i.e., if the number of times no response has been returned to the polling has not reached the maximum value Nmax yet, control returns to step S311, and the subsequent processes are repeated.

If the number of times no response has been returned to the polling has reached the maximum value Nmax, it is very likely that the time slot has been set in all secure elements 62. Accordingly, a procedure is next performed to shift the secure elements 62, which have been set to the sleep mode, to the normal mode.

That is, at step S317, the determination section 84 determines whether the reset request has been transmitted to all secure elements 62 that have been recognized. If the secure elements 62 whose identification numbers have been recognized include any secure element 62 to which the reset request has not been transmitted yet, the selection section 85 selects one such secure element 62 at step S318. At step S319, the transmission section 81 transmits the reset request to the selected secure element 62.

At step S125 in FIG. 6, the determination section 101 of the secure element 62 determines whether the received signal is the reset request. If the received signal is the reset request, the transmission section 103 transmits a response at step S134, with the identification If it is determined at step S125 that the received signal is not the reset request, which means that the received signal is another signal than the polling request, the set time slot request, and the reset request. Accordingly, at step S136, the secure element 62 performs a process corresponding to that signal. Thereafter, control returns to step S121, and the subsequent processes are repeated.

Returning to FIG. 10, at step S320, the reception section 82 of the baseband controller 61 receives the reset response transmitted by the secure element 62 at step S134 in FIG. 6. Thus, because the secure element 62 has been set to the normal mode, it is capable of performing normal processes thereafter.

Thereafter, at step S317, the determination section 84 determines again whether the reset request has been transmitted to all of the secure elements 62 that have been recognized. If the secure elements 62 whose identification numbers have been recognized include any secure element 62 to which the reset request has not been transmitted yet, one such secure element 62 is selected at step S318, the process of transmitting the reset request to that secure element 62 is performed at step S319, and the process of receiving a response therefrom is performed at step S320.

In the above-described manner, similar processes are repeated until it is determined at step S317 that the reset request has been transmitted to all the recognized secure elements 62. This procedure is finished when all the secure elements 62 have shifted to the normal mode.

Next, referring to FIGS. 11 to 14, the time slot setting process performed at the time of the normal activation between the baseband controller 61, the secure elements 62, and the front end 63 will now be described below.

At step S401, the transmission section 81 of the baseband controller 61 transmits the polling request to the secure elements 62 of all system codes. The front end 63 receives this request at step S541, and transmits this request to all the secure elements 62 at step S542, by broadcasting it or via the path control. In the current case, because the secure elements 62-1 and 62-2 as well as the secure element 62-0 are installed, the reception sections 102 of the secure elements 62-0, 62-1, and 62-2 receive the request at steps S451 S481, and S511, respectively.

Note that, although the polling request is transmitted to its source as well, an illustration and description thereof are omitted here for convenience.

At step S452, the transmission section 103 of the secure element 62-0 responds to this request. That is, the secure element 62-0 transmits the polling response, with its own identification number, ID0, added thereto, to the baseband controller 61, i.e., the source of the request, in the earliest time slot number TSN0 stored therein. The front end 63 receives this response at step S543, and transmits this response to the baseband controller 61 at step S544.

At step S402, the baseband controller 61 receives this response via the reception section 82 thereof, thereby recognizing the identification number ID0 of the responding secure element 62-0. Accordingly, the baseband controller 61 becomes capable of directly communicating with the secure element 62-0 thereafter.

The polling request is responded to by the secure elements 62-1 and 62-2 as well. However, because the time slot number has not yet been set in the secure element 62-1 or 62-2, they respond to the polling request at the timings corresponding to the random slot numbers.

Assuming that the secure element 62-2 responds at a timing corresponding to a number of the second earliest time slot after that of the secure element 62-0, for example, the transmission section 103 of the secure element 62-2 returns the polling response at step S512, with the identification number ID2 of its own secure element 62 added thereto, to the baseband controller 61, the source of the request. The front end 63 receives this polling response at step S545, and transmits this polling response to the baseband controller 61, i.e., the source of the polling request, at step S546.

At step S403, the baseband controller 61 receives this response via the reception section 82 thereof, thereby recognizing the identification number ID2 of the responding secure element 62-2. Accordingly, the baseband controller 61 becomes capable of directly communicating with the secure element 62-2 thereafter.

Assuming that the secure element 62-1 responds at a timing corresponding to a number of the next earliest time slot relative to that of the secure element 62-2, the transmission section 103 of the secure element 62-1 transmits the polling response at step S482, with the identification number ID1 of its own secure element 62 added thereto, to the baseband controller 61, i.e., the source of the request. The front end 63 receives this polling response at step S547, and transmits this polling response to the baseband controller 61, i.e., the source of the polling request, at step S548.

At step S404, the baseband controller 61 receives this response via the reception section 82, thereby recognizing the identification number ID1 of the responding secure element 62-1. Accordingly, the baseband controller 61 becomes capable of directly communicating with the secure element 62-1 thereafter.

The baseband controller 61, which has recognized the identification numbers in the above-described manner, performs a process of allocating the time slot numbers to the secure elements 62 in the order of the reception of the responses. In the following description, however, it is assumed that a collision has occurred, and that the time slot number has not yet been set in either of the secure elements 62-1 and 62-2.

At step S405, the transmission section 81 of the baseband controller 61 transmits the set time slot request with the time slot number TSN0 to the secure element 62-0, whose identification number is ID0. Note, however, that because the time slot number TSN0 was previously set and stored in the secure element 62-0 at the time of the manufacture as described above, this request is made to allow the secure element 62-0 to enter a sleep state.

The front end 63 receives the set time slot request at step S549, and transmits this request to the secure element 62-0 at step S550. Needless to say, the signal is transmitted to the secure elements 62-1 and 62-2 as well, but because of address disagreement, it is ignored thereby.

The reception section 102 of the secure element 62-0 receives the set time slot request at step S453, but because the storage section 104 stores the time slot number TSN0 already, a new storage process is not performed (step S130 in FIG. 6), and the transmission section 103 returns the set time slot response at step S454 (step S132 in FIG. 6). Then, the mode setting section 105 sets the mode to the sleep mode (step S133 in FIG. 6).

The front end 63 receives this set time slot response at step S551, and transmits this response to the baseband controller 61, i.e., the source of the request, at step S552. The baseband controller 61 receives this response via the reception section 82 thereof at step S406, thereby recognizing that the secure element 62-0 has shifted to the sleep mode.

In the current case, because the identification numbers of the secure elements 62-1 and 62-2 have not been recognized yet, the transmission section 81 of the baseband controller 61 transmits the polling request to the secure elements 62 of all system codes at step S407. The front end 63 receives this request at step S553, and transmits this request to all the secure elements 62 at step S554, by broadcasting it or via the path control. The reception sections 102 of the secure elements 62-0, 62-1, and 62-2 receive this at steps S455, S483, and S513, respectively. In the current case, because the secure element 62-0 has shifted to the sleep mode already, only the secure elements 62-1 and 62-2 return responses at timings corresponding to random time slot numbers.

Assuming that the secure element 62-2 is the first to respond, for example, the transmission section 103 thereof responds to this request at step S514 by transmitting the polling response, with the identification number of its own secure element 62, ID2, added thereto, to the baseband controller 61, i.e., the source of the request. The front end 63 receives this response at step S555, and transmits this response to the baseband controller 61 at step S556. The reception section 82 of the baseband controller 61 receives this response at step S408.

Assuming that the secure element 62-1 responds next, the transmission section 103 thereof responds to the polling request at step S484 by transmitting the polling response, with the identification number of its own secure element 62, ID1, added thereto, to the baseband controller 61, i.e., the source of the request. The front end 63 receives this response at step S557, and transmits this response to the baseband controller 61 at step S558. The reception section 82 of the baseband controller 61 receives this response at step S409.

The baseband controller 61 performs the process of setting the time slot numbers in the order of the reception of the responses. That is, at step S410, the transmission section 81 of the baseband controller 61 transmits the set time slot request to the secure element 62-2, whose identification number is ID2. In this request, the number TSN1, which corresponds to the second earliest timing after that of the minimum value TSN0, is set as the time slot number TSN.

The front end 63 receives this request at step S559, and transmits this request to the secure element 62-2, whose identification number is ID2, at step S560. The reception section 102 of the secure element 62-2 receives this request at step S515. Needless to say, the request is transmitted to the secure elements 62-0 and 62-1 as well and received thereby at steps S456 and S485, respectively, but because of address disagreement, it is ignored thereby.

After the secure element 62-2 receives this request via the reception section 102 thereof at step S515, the storage section 104 stores the time slot number TSN1 therein in the volatile manner. As a result, the secure element 62-2 comes to communicate at the timing corresponding to the stored time slot number TSN1 thereafter.

At step S516, the transmission section 103 of the secure element 62-2 transmits the set time slot response to the baseband controller 61, i.e., the source of the request (step S132 in FIG. 6). To this response, ID2 is added as the identification number of the transmitter, and the set and stored time slot number TSN1 is also added for confirmation. After the output of this response, the mode is set to the sleep mode (step S133 in FIG. 6).

After receiving this response at step S561, the front end 63 transmits this response to the baseband controller 61 at step S562. The reception section 82 of the baseband controller 61 receives this response at step S411, thereby recognizing that the time slot number has been stored in the secure element 62-2.

In the case where the response transmitted from the secure element 62-1 at step S484 has not been received successfully by the baseband controller 61 due to the occurrence of a collision, the baseband controller 61 transmits the polling request again to the secure elements 62 of all system codes at step S412. The front end 63 receives this request at step S563, and transmits this request to all the secure elements 62 at step S564, by broadcasting it or via the path control. The reception sections 102 of the secure elements 62-0, 62-1, and 62-2 receive this at steps S457, S486, and S517, respectively. In the current case, the secure elements 62-0 and 62-2 have shifted to the sleep mode already, and therefore, only the secure element 62-1 returns a response at a timing corresponding to a random time slot number.

The transmission section 103 of the secure element 62-1 responds to the polling request at step S487 by transmitting the polling response, with the identification number of its own secure element 62, ID1, added thereto, to the baseband controller 61, i.e., the source of the request. The front end 63 receives this response at step S565, and transmits this response to the baseband controller 61 at step S566. The reception section 82 of the baseband controller 61 receives this response at step S413.

Next, the baseband controller 61 performs the process of setting the time slot number. That is, at step S414, the transmission section 81 of the baseband controller 61 transmits the set time slot request to the secure element 62-1, whose identification number is ID1. In this request, the time slot number TSN2 is set.

The front end 63 receives this request at step S567, and transmits this request to the secure element 62-1, whose identification number is ID1, at step S568. The reception section 102 of the secure element 62-1 receives this request at step S488. Needless to say, the request is transmitted to the secure elements 62-0 and 62-2 as well and received thereby at steps S458 and S518, respectively, but because of address disagreement, it is ignored thereby.

After the secure element 62-1 receives the request via the reception section 102 thereof at step S488, the storage section 104 stores the time slot number TSN2 therein in the volatile manner. As a result, the secure element 62-1 comes to communicate at the timing corresponding to the stored time slot number TSN2 thereafter.

At step S489, the transmission section 103 of the secure element 62-1 transmits the set time slot response to the baseband controller 61, i.e., the source of the request. To this response, ID1 is added as the identification number of the transmitter, and the set and stored time slot number TSN2 is also added for confirmation. After the output of this response, the mode of the secure element 62-1 is shifted to the sleep mode (step S133 in FIG. 6).

After receiving this response at step S569, the front end 63 transmits this response to the baseband controller 61 at step S570. The reception section 82 of the baseband controller 61 receives this response at step S415, thereby recognizing that the time slot number has been stored in the secure element 62-1.

Because the setting of the time slot numbers has been completed as described above, the process of returning the mode of the secure elements 62 to the normal mode is performed as follows.

At step S416, the transmission section 81 of the baseband controller 61 transmits the reset request to the secure element 62-0, whose identification number is ID0.

The front end 63 receives this request at step S571, and transmits this request to the secure element 62-0, whose identification number is ID0, at step S572. The reception section 102 of the secure element 62-0 receives this request at step S459. Needless to say, the request is transmitted to the secure elements 62-1 and 62-2 as well and received thereby at steps S490 and S519, respectively, but because of address disagreement, it is ignored thereby.

After the secure element 62-0 receives this request via the reception section 102 thereof at step S459, the transmission section 103 transmits a response, with the identification number ID0 added thereto, to the baseband controller 61, i.e., the source of the request, at step S460 (step S134 in FIG. 6), and the mode setting section 105 sets the mode to the normal mode (step S135 in FIG. 6). As a result, the secure element 62-0 becomes capable of performing the normal processes thereafter.

After receiving this response at step S573, the front end 63 transmits this response to the baseband controller 61 at step S574. The reception section 82 of the baseband controller 61 receives this response at step S417, thereby recognizing that the secure element 62-0 has shifted to the normal mode.

The process of causing the other secure elements 62 to shift to the normal mode is performed in a similar manner.

At step S418, the transmission section 81 of the baseband controller 61 transmits the reset request to the secure element 62-2, whose identification number is ID2.

The front end 63 receives this request at step S575, and transmits this request to the secure element 62-2, whose identification number is ID2, at step S576. The reception section 102 of the secure element 62-2 receives this request at step S520. Needless to say, the request is transmitted to the secure elements 62-0 and 62-1 as well and received thereby at steps S461 and S491, respectively, but because of address disagreement, it is ignored thereby.

After the secure element 62-2 receives this request via the reception section 102 thereof at step S520, the transmission section 103 transmits a response, with the identification number ID2 added thereto, to the baseband controller 61, i.e., the source of the request, at step S521 (step S134 in FIG. 6), and the mode setting section 105 sets the mode to the normal mode (step S135 in FIG. 6). As a result, the secure element 62-2 becomes capable of performing the normal processes thereafter.

After receiving this response at step S577, the front end 63 transmits this response to the baseband controller 61 at step S578. The reception section 82 of the baseband controller 61 receives this response at step S419, thereby recognizing that the secure element 62-2 has shifted to the normal mode.

Further, at step S420, the transmission section 81 of the baseband controller 61 transmits the reset request to the secure element 62-1, whose identification number is ID1.

The front end 63 receives this request at step S579, and transmits this request to the secure element 62-1, whose identification number is ID1, at step S580. At step S492, the reception section 102 of the secure element 62-1 receives this request. Needless to say, the request is transmitted to the secure elements 62-0 and 62-2 as well and received thereby at steps S462 and S522, respectively, but because of address disagreement, it is ignored thereby.

After the secure element 62-1 receives this request via the reception section 102 thereof at step S492, the transmission section 103 transmits a response, with the identification number ID1 added thereto, to the baseband controller 61, i.e., the source of the request, at step S493 (step S134 in FIG. 6), and the mode setting section 105 sets the mode to the normal mode (step S135 in FIG. 6). As a result, the secure element 62-1 becomes capable of performing the normal processes thereafter.

After receiving this response at step S581, the front end 63 transmits this response to the baseband controller 61 at step S582. The reception section 82 of the baseband controller 61 receives this response at step S420, thereby recognizing that the secure element 62-1 has shifted to the normal mode.

In the foregoing example, it is assumed that each secure element 62 is specified individually to output the reset request thereto. Note, however, that all the secure elements 62 may be specified at a time as the target thereof.

Figure 15:
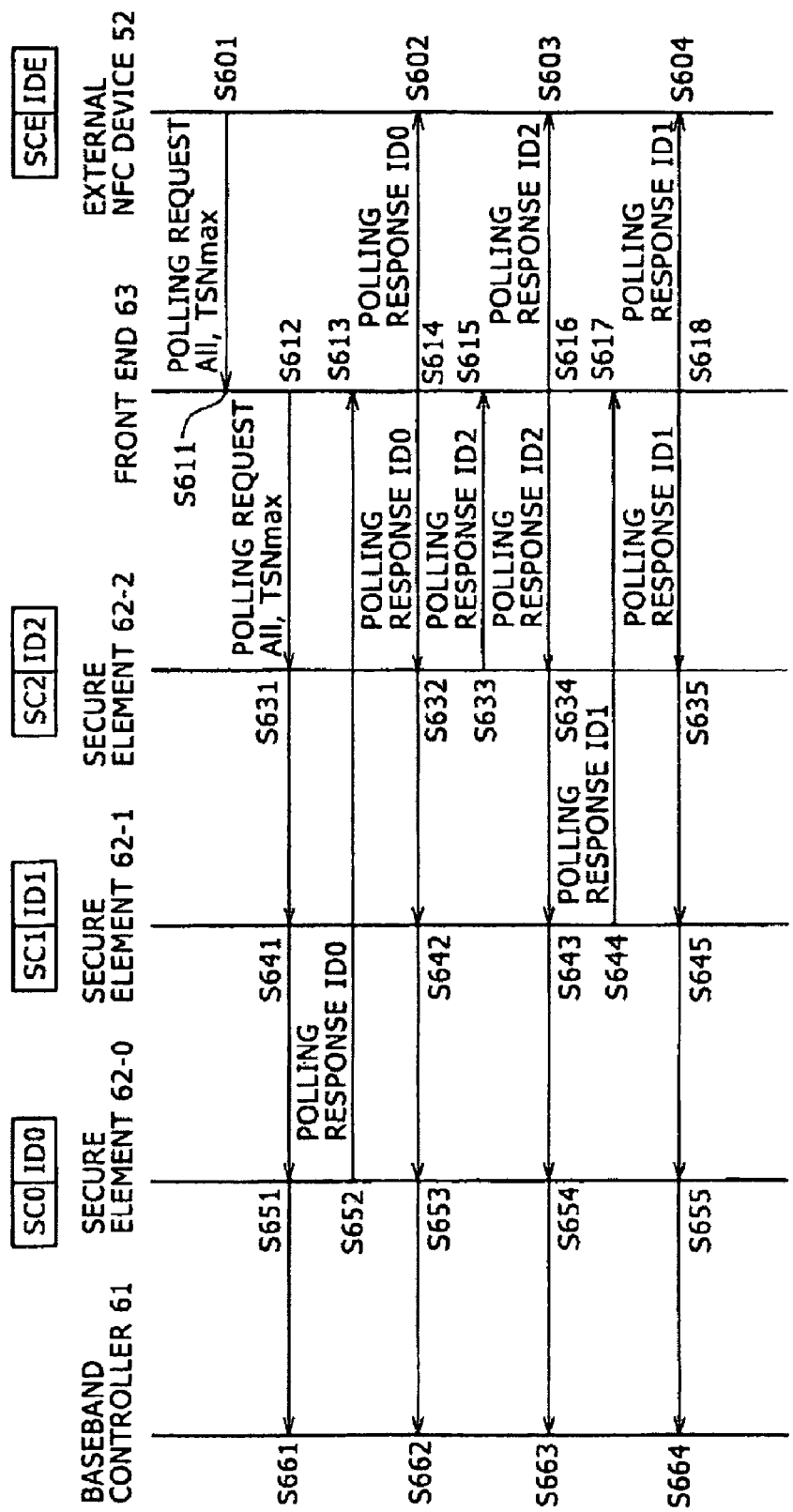
FIG. 15 is a diagram illustrating a procedure in the case where a polling is conducted by an external NFC device according to an embodiment of the present invention.

Because the allocation of the time slot numbers is performed such that the same time slot number is not allocated to multiple secure elements 62 as described above, a collision will never occur thereafter. When a polling is conducted by the external NFC device 52, for example, a procedure is performed in a manner as illustrated in FIG. 15.

At step S601, the external NFC device 52 outputs a polling request to the NFC device 51. At this time, the system code of the communication destination is set to All, and the time slot number is set to the maximum settable number TSNmax.

The front end 63 in the NFC device 51 receives this request at step S611, and supplies it to each part within the NFC device 51 at step S612. The secure elements 62-2, 62-1, and 62-0 and the baseband controller 61 receive this request at steps S631, S641, S651, and S661, respectively.

Each of the secure elements 62 responds to this request at the timing corresponding to the time slot number respectively set therein. Specifically, at step S652, the secure element 62-0, in which the earliest time slot number TSN0 is set, returns a polling response, with its own identification number ID0 added thereto. The front end 63 receives this response at step S613, and supplies it to the external NFC device 52 and each secure element 62 at step S614.

The external NFC device 52 receives this response at step S602. As a result, the external NFC device 52 recognizes the identification number of the secure element 62-0. The secure elements 62-2, 62-1, and 62-0 and the baseband controller 61 receive this response at steps S632, S642, S653, and S662, respectively, but ignore it because they have not outputted the request.

Next, at step S633, the secure element 62-2, in which the second earliest time slot number TSN1 is set, returns a polling response, with its own identification number ID2 added thereto. The front end 63 receives this response at step S615, and supplies it to the external NFC device 52 and each secure element 62 at step S616.

The external NFC device 52 receives this response at step S603. As a result, the external NFC device 52 recognizes the identification number of the secure element 62-2. The secure elements 62-2, 62-1, and 62-0 and the baseband controller 61 receive this response at steps S634, S643, S654, and S663, respectively, but ignore it because they have not outputted the request.

Further, at step S644, the secure element 62-1, in which the latest time slot number TSN2 is set, returns a polling response, with its own identification number ID1 added thereto. The front end 63 receives this response at step S617, and supplies it to the external NFC device 52 and each secure element 62 at step S618.

The external NFC device 52 receives this response at step S604. As a result, the external NFC device 52 recognizes the identification number of the secure element 62-1. The secure elements 62-2, 62-1, and 62-0 and the baseband controller 61 receive this response at steps S635, S645, S655, and S664, respectively, but ignore it because they have not outputted the request.

As described above, the time slot numbers are set such that the same time slot number is not set in multiple secure elements 62. Therefore, even when a period of time allocated to the time slot of each number is short, a collision does not occur, and quick communication is possible.

Next, referring to FIG. 16, a procedure will be described in the case where the NFC device 51 reads data from the external NFC device 52.

At step S671, the baseband controller 61 in the NFC device 51 outputs a polling, request to the front end 63. At this time, the system code of the communication destination is set to a system code SCE of the external NFC device 52, and the time slot number is set to the maximum settable number TSNmax.

The front end 63 in the NFC device 51 receives this request at step S721, and supplies it to each part within the NFC device 51 and the external NFC device 52 at step S722. The secure elements 62-2, 62-1, and 62-0 and the baseband controller 61 receive this request at steps S711, S691, S681, and S672, respectively, whereas the external NFC device 52 receives this request at step S741.

Neither each secure element 62 nor the baseband controller 61 responds thereto because of a disagreement in the system code. Because the system code corresponds with its own system code, the external NFC device 52 responds to this request at a timing corresponding to a random time slot number. That is, at step S742, the external NFC device 52 returns a polling response, with its own identification number IDE added thereto. The front end 63 receives this response at step S723, and supplies it to each secure element 62 and the baseband controller 61 at step S724.

The secure elements 62-2, 62-1, and 62-0 receive this response at steps S712, S692, and S682, respectively, but ignore it because they have not outputted the polling request. The baseband controller 61, which has outputted the polling request, receives this response at step S673, thereby recognizing the identification number of the external NFC device 52.

Next, at step S674, the baseband controller 61 transmits a read request while specifying the identification number IDE of the other party. The front end 63 receives this request at step S725, and supplies it to each part within the NFC device 51 and the external NFC device 52 at step S726. The secure elements 62-2, 62-1, and 62-0 and the baseband controller 61 receive this request at steps S713, S693, S683, and S675, respectively, but ignore it because of a disagreement in the identification number. The external NFC device 52 receives this request at step S743.

The external NFC device 52, which has received the read request at step S743, returns a read response at step S744, with its own identification number IDE added thereto. The front end 63 receives this response at step S727, and supplies it to each secure element 62 and the baseband controller 61 at step S728.

The secure elements 62-2, 62-1, and 62-0 receive this response at steps S714, S694, and S684, respectively, but ignore it because they have not outputted the read request. The baseband controller 61 receives this response at step S676. As a result, the baseband controller 61 becomes capable of reading the data from the external NFC device 52 thereafter.

A procedure in the case where, conversely, the external NFC device 52 reads data from, for example, the secure element 62-1 in the NFC device 51 is such as shown in FIG. 17.

At step S801, the external NFC device 52 outputs a polling request to the NFC device 51. At this time, the system code of the communication destination is set to the system code SC1 of the secure element 62-1, and the time slot number is set to the maximum settable number TSNmax.

The front end 63 in the NFC device 51 receives this request at step S81.1, and supplies it to each part within the NFC device 51 at step S812. The secure elements 62-2, 62-1, and 62-0 and the baseband controller 61 receive this request at steps S831, S841, S861, and S871, respectively.

The secure elements 62-0 and 62-2 and the baseband controller 61 do not respond thereto because of a disagreement with the system code. Because the system code corresponds with its own system code SC1, the secure element 62-1 responds to this request at the timing corresponding to the time slot number TSN2 set therein. That is, at step S842, the secure element 62-1 returns a polling response, with its own identification number ID1 added thereto. The front end 63 receives this response at step S813, and supplies it to each secure element 62, the baseband controller 61, and the external NFC device 52 at step S814.

The secure elements 62-2, 62-1, and 62-0 and the baseband controller 61 receive this response at steps S832, S843, S862, and S872, respectively, but ignore it because they have not outputted the request. The external NFC device 52, which has outputted the request, receives this response at step S802, thereby recognizing the identification number ID1 of the secure element 62-1.

Next, at step S803, the external NFC device 52 transmits a read request while specifying the identification number ID1 of the other party. The front end 63 receives this request at step S815, and supplies it to each part within the NFC device 51 at step S816. The secure elements 62-2 and 62-0 and the baseband controller 61 receive this request at steps S833, S863, and S873, respectively, but ignore it because of a disagreement in the identification number. The secure element 62-1 receives this request at step S844.

The secure element 62-1, which has received the read request at step S844, returns a read response at step S845, with its own identification number ID1 added thereto. The front end 63 receives this response at step S817, and supplies it to each secure element 62, the baseband controller 61, and the external NFC device 52 at step S818.

The secure elements 62-2, 62-1, and 62-0 and the baseband controller 61 receive this response at steps S834, S846, S864, and S874, respectively, but ignore it because they have not outputted the request. The external NFC device 52 receives this response at step S804. As a result, the external NFC device 52 becomes capable of reading the data from the secure element 62-1 thereafter.

The above-described series of processes may be implemented either in hardware or software. In the case where the series of processes is implemented in software, a program that constitutes the software is installed from a program storage medium into a computer having a dedicated hardware configuration or into a general-purpose personal computer or the like that becomes capable of performing various functions when various programs are installed thereon.

Note that steps representing the program may be performed chronologically in the order as described in the present specification, naturally. However, it is not essential that they be performed chronologically. Some of the steps may be performed in parallel or separately.

Also note that the term system as used in the present specification refers to an apparatus as a whole composed of a plurality of devices.

Obviously, numerous modifications and variations of the present invention are possible in light of the above teachings. It is therefore to be understood that within the scope of the appended claims, the invention may be practiced otherwise than as specifically described herein.

The invention claimed is:

1. An information processing apparatus, comprising:
a plurality of elements each configured to perform an independent process;
a controller configured to control said plurality of elements; and
a front end shared by said plurality of elements and configured to perform near field communication with an external device,
wherein said controller allocates different time slots corresponding to the plurality of elements for avoiding an occurrence of a conflict.

2. The information processing apparatus according to claim 1, wherein,
said elements are contained in a single housing and connected to one another in a wired manner, and
the apparatus is activated when power has been supplied or when any of said elements has been removed or added.

3. The information processing apparatus according to claim 1, wherein,
said plurality of elements are composed of at least one removable and at least one fixed element, and
said at least one fixed element stores the allocated time slots in a nonvolatile manner, whereas said at least one removable element stores the time sloth in a volatile manner.

4. The information processing apparatus according to claim 3, wherein said controller allocates, to said at least one fixed element, a time slot of an earliest timing, and allocates, to said at least one removable element, a time slot of a later timing than that of said at least one fixed element.

5. The information processing apparatus according to claim 3, wherein the time slots of said at least one fixed element are allocated thereto beforehand at a time of manufacture.

6. The information processing apparatus according to claim 3, wherein,
each of said plurality of elements is an element that securely performs a process based on a corresponding application, has application-based identification information and element-based identification information, and has a function of performing communication in a time slot of a random timing before the time slot is allocated thereto; and
said controller performs the allocation of the time slot employing the function of performing the communication in the time slot of the random timing.

7. The information processing apparatus according to claim 3, wherein each of said plurality of elements has a normal mode in which said element responds to a polling request and a request for setting the time slots, and a sleep mode in which an element responds to a reset request; and shifts to the normal mode when the reset request has been received while in the sleep mode, and shifts to the sleep mode when the time slots are set while in the normal mode.

8. An information processing method employed by an information processing apparatus, the method comprising:
performing with a processor an independent process with a plurality of elements;
controlling the plurality of elements with a controller, said controller including a processor; and
performing near field communication with a front end shared by the plurality of elements, said near field communication including a wireless transmission with an external device, wherein
the controller allocates different time slots corresponding to the plurality of elements for avoiding an occurrence of a conflict.

9. The information processing method according to claim 8, wherein,
said elements are contained in a single housing in said information processing apparatus and connected to one another in a wired manner, and
the method is activated when power has been supplied or when any of said elements has been removed or added.

10. The information processing method according to claim 8, wherein,
said plurality of elements are composed of at least one removable and at least one fixed element, and
said at least one fixed element stores the allocated time slots in a nonvolatile manner, whereas said at least one removable element stores the time slots in a volatile manner.

11. The information processing method according to claim 10, wherein said controller allocates, to said at least one fixed element, a time slot of an earliest timing, and allocates, to said at least one removable element, a time slot of a later timing than that of said at least one fixed element.

12. The information processing method according to claim 10, wherein the time slots of said at least one fixed element are allocated thereto beforehand at a time of manufacture.

13. The information processing method according to claim 10, wherein,
each of said plurality of elements is an element that securely performs a process based on a corresponding application, has application-based identification information and element-based identification information, and has a function of performing communication in a time slot of a random timing before the time slot is allocated thereto; and
said controller performs the allocation of the time slot employing the function of performing the communication in the time slot of the random timing.

14. The information processing method according to claim 10, wherein each of said plurality of elements has a normal mode in which said element responds to a polling request and a request for setting the time slots, and a sleep mode in which an element responds to a reset request; and shifts to the normal mode when the reset request has been received while in the sleep mode, and shifts to the sleep mode when the time slots are set while in the normal mode.

15. A computer readable storage medium encoded with instructions which when executed by an information processing apparatus cause a processor to execute an information processing method comprising:
performing with the processor an independent process with a plurality of elements;
controlling the plurality of elements with a controller, said controller including the processor; and
performing near field communication with a front end shared by the plurality of elements, said near field communication including a wireless transmission with an external device, wherein
the controller allocates different time slots corresponding to the plurality of elements for avoiding an occurrence of a conflict.

16. The computer readable storage medium according to claim 15, wherein,
said elements are contained in a single housing in said information processing apparatus and connected to one another in a wired manner, and
the method is activated when power has been supplied or when any of said elements has been removed or added.

17. The computer readable storage medium according to claim 15, wherein,
said plurality of elements are composed of at least one removable and at least one fixed element, and
said at least one fixed element stores the allocated time slots in a nonvolatile manner, whereas said at least one removable element stores the time slots in a volatile manner.

18. The computer readable storage medium according to claim 17, wherein said controller allocates, to said at least one fixed element, a time slot of an earliest timing, and allocates, to said at least one removable element, a time slot of a later timing than that of said at least one fixed element.

19. The computer readable storage medium according to claim 17, wherein the time slots of said at least one fixed element are allocated thereto beforehand at a time of manufacture.

20. The computer readable storage medium according to claim 17, wherein, each of said plurality of elements is an element that securely-performs a process based on a corresponding application, has application-based identification information and element-based identification information, and has a function of performing communication in a time slot of a random timing before the time slot is allocated thereto; and said controller performs the allocation of the time slot employing the function of performing the communication in the time slot of the random timing.

\* \* \* \* \*